United States Patent
Beck et al.

(10) Patent No.: US 11,989,720 B2
(45) Date of Patent: May 21, 2024

(54) SYSTEM AND METHOD FOR OBLIVIOUS INFORMATION RETRIEVAL

(71) Applicant: MobileCoin, San Francisco, CA (US)

(72) Inventors: Christopher Beck, San Francisco, CA (US); James Cape, San Francisco, CA (US); Joseph Yandle, San Francisco, CA (US); Robb Walters, San Francisco, CA (US); Sara Drakeley Hall, Tahoe, CA (US)

(73) Assignee: MOBILECOIN INC., San Francisco, CA (US)

( * ) Notice: Subject to any disclaimer, the term of this patent is extended or adjusted under 35 U.S.C. 154(b) by 728 days.

(21) Appl. No.: 17/070,481

(22) Filed: Oct. 14, 2020

(65) Prior Publication Data

US 2022/0114579 A1 Apr. 14, 2022

(51) Int. Cl.
*H04L 29/06* (2006.01)
*G06F 21/64* (2013.01)
(Continued)

(52) U.S. Cl.
CPC ......... *G06Q 20/3674* (2013.01); *G06F 21/64* (2013.01); *G06Q 20/02* (2013.01);
(Continued)

(58) Field of Classification Search
CPC .. G06Q 20/3674; G06Q 20/326; G06Q 20/02; G06Q 20/0658; G06Q 20/363;
(Continued)

(56) References Cited

U.S. PATENT DOCUMENTS

2015/0262139 A1 9/2015 Shtylman
2015/0262171 A1 9/2015 Langschaedel
(Continued)

FOREIGN PATENT DOCUMENTS

GB 2387930 10/2003
WO WO2017082966 A1 5/2017

OTHER PUBLICATIONS

Noether, Shen and Noether, Sarang, "Monero is Not That Mysterious", Monero Research Lab Research Bulletin, MRL-0003, Sep. 25, 2014, pp. 1-10.

*Primary Examiner* — Yogesh Paliwal
(74) *Attorney, Agent, or Firm* — Inventive Law Inc.; Jim H. Salter

(57) ABSTRACT

A system and method for oblivious information retrieval are disclosed. A particular embodiment includes: a plurality of network nodes in data communication with each other via a network, each network node having a secure processing enclave, the enclave configured to include: at least one isolated memory device, processing logic isolated from operating system (OS) calls, and a remote attestation capability; and a view node in data communication with the plurality of network nodes and a transaction ledger, the view node including an account index horizontally scaled across a plurality of computing devices, the view node further configured to receive a transaction and a corresponding account hint, to decrypt the account hint, and to add a row corresponding to the transaction and the account hint to the account index.

20 Claims, 28 Drawing Sheets

(51) Int. Cl.
- *G06Q 20/02* (2012.01)
- *G06Q 20/06* (2012.01)
- *G06Q 20/32* (2012.01)
- *G06Q 20/36* (2012.01)
- *G06Q 20/38* (2012.01)
- *H04L 9/08* (2006.01)
- *H04L 9/32* (2006.01)
- *H04L 9/00* (2022.01)

(52) U.S. Cl.
CPC ....... *G06Q 20/0658* (2013.01); *G06Q 20/326* (2020.05); *G06Q 20/363* (2013.01); *G06Q 20/3825* (2013.01); *G06Q 20/385* (2013.01); *H04L 9/0825* (2013.01); *H04L 9/0844* (2013.01); *H04L 9/0897* (2013.01); *H04L 9/3234* (2013.01); *H04L 9/50* (2022.05)

(58) Field of Classification Search
CPC .. G06Q 20/3825; G06Q 20/385; G06F 21/64; H04L 9/0825; H04L 9/0844; H04L 9/0897; H04L 9/3234; H04L 9/50; H04L 2209/56; H04L 9/0894
See application file for complete search history.

(56) References Cited

U.S. PATENT DOCUMENTS

| | | |
|---|---|---|
| 2015/0262172 A1 | 9/2015 | Rebernik |
| 2015/0262176 A1 | 9/2015 | Langschaedel |
| 2015/0324789 A1* | 11/2015 | Dvorak ............... H04L 63/0861 705/67 |
| 2016/0261999 A1 | 9/2016 | Harper |
| 2016/0321629 A1 | 11/2016 | Mccoy |
| 2016/0344543 A1 | 11/2016 | Alness |
| 2016/0371679 A1 | 12/2016 | Goto |
| 2017/0193464 A1 | 7/2017 | Sher |
| 2017/0212679 A1* | 7/2017 | Pass ...................... G06F 3/0673 |
| 2017/0270492 A1 | 9/2017 | Donovan |
| 2018/0227293 A1 | 8/2018 | Uhr |
| 2020/0104428 A1* | 4/2020 | Bier ...................... H04L 9/3239 |
| 2020/0184093 A1* | 6/2020 | Liu ......................... G06F 21/64 |

* cited by examiner

Basic Process

Basic Process with View Node

Basic Account Server (Wakeup)

Basic Account Server (Bob sign-up)

Basic Account Server
(Bob Public Data)

Basic Account Server
(Alice Submits Tx)

Basic Account Server (Processing)

Basic Account Server
(Bob Recovery)

Bob's Keys

Recovery Ledger Format

Account Server (Processing)

Wallet Server
(Notifications or Polling)

Wallet Server (Bob Full Recovery)

SYSTEM AND METHOD FOR OBLIVIOUS INFORMATION RETRIEVAL

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2017-2020, MobileCoin, All Rights Reserved.

TECHNICAL FIELD

This patent document pertains generally to data processing and networked systems, secure information repositories, secure online information transaction systems, online payment systems, and more particularly, but not by way of limitation, to a system and method for oblivious information retrieval.

BACKGROUND

Digital currency, crypto-currency, and blockchain technologies have been developed to facilitate the secure transfer of online payments. These technologies use encrypted keys and sophisticated decentralized data structures or blockchains to record and validate transactions across a network of distributed computing nodes. The blockchain for a particular implementation must be constantly synchronized between the distributed computing nodes to assure security and validity of the payment and transaction data. The blockchain synchronization, key management, and transaction handling can consume a significant level of processing capacity and device resources on the computing nodes. In many conventional implementations, a trusted third party service is used to manage keys and validate transactions. However, the third party service can be vulnerable to being compromised thereby destroying the security of the online payment system. Moreover, the processing loads and resource demands on the computing nodes can overwhelm the nodes thereby slowing transaction times, causing latency, and producing an unacceptable user experience. The situation is exacerbated when mobile applications or mobile devices are used as mobile applications typically don't have the ability or capacity to synchronize an entire multi-gigabyte blockchain. Mobile applications can produce minutes-long transaction times, which are unacceptable for typical use cases. Additionally, mobile device end users are not typically equipped to reliably maintain secret keys over a long period of time. As a result, conventional digital currency, crypto-currency, and blockchain technologies are unable to support secure, efficient, rapid, and user-friendly secure transactions, especially on mobile applications or mobile devices.

SUMMARY

A system and method for oblivious information retrieval are disclosed. The secure transaction network system of an example embodiment can be deployed, in a particular implementation, as a payment system designed to be used by network user/consumers. In various example embodiments, users on mobile devices and mobile applications can use the disclosed secure transaction network system without unacceptable latency or compromised security. Several important design principles of the secure transaction network system disclosed herein include simplicity, speed, and security. All of these principles are addressed with complex technical systems that are hidden beneath great user experiences. The network users don't have to understand how the secure transaction network system works to use the system effectively. Another important design principle of the secure transaction network system is user privacy. The disclosed embodiments enable users to control their data and make meaningful choices about their data and the use thereof.

When the secure transaction network system of an example embodiment is deployed as a payment system, secure transactions can be initiated by users to transfer digital cash between users. Just like paper money, digital cash requires a wallet. As disclosed herein, a wallet is a software module configured to manage a user's digital cash. A wallet enables a user to send and receive digital cash via the secure transaction network system. In some implementations, the wallet can be configured to execute and manage a user's digital cash on a mobile device. However, in other implementations, the wallet can be configured to execute on a mobile device while managing and storing the user's digital cash through financial institutions. Unlike paper money, digital cash can be sent over a data network (e.g., the Internet) via the secure transaction network system to any other user's wallet. When a user transfers digital cash to another user's wallet using the secure transaction network system disclosed herein, the only record of the transaction is in the sender user's wallet and in the receiver user's wallet. In particular, the sender has an entry in their wallet indicating that they spent digital cash; but, the sender does not retain a specific record of where the digital cash was sent. Similarly, the receiver has an entry in their wallet indicating that they received digital cash; but, the receiver does not retain a specific record detailing from where the digital cash was received. As a result, the anonymity of the transaction is preserved.

In an example embodiment of the secure transaction network system, a user can configure their wallet to manage where and how the transaction records for a particular user are stored or backed up. In particular, the secure transaction network system does not keep any identifying records of a user's transactions. However, every user can use their wallet to configure the type of information to store for the particular user. In various example embodiments, user wallets can be configured with a variety of privacy settings to accommodate various levels of user data privacy. Further details of various example embodiments of the secure transaction network system are provided below with reference to the figures provided herewith.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for oblivious information retrieval are disclosed. The secure transaction network system of an example embodiment can be deployed, in a particular implementation, as a payment system designed to be used by network user/consumers. In various example embodiments, users on mobile devices and mobile applications can use the disclosed secure transaction network system without unacceptable latency or compromised security.

When the secure transaction network system of an example embodiment is deployed as a payment system, secure transactions can be initiated by users with wallets to transfer digital cash between users. As disclosed herein, a wallet is a software module configured to manage a user's digital cash. A wallet enables a user to send and receive digital cash via the secure transaction network system. In some implementations, the wallet can be configured to execute and manage a user's digital cash on a mobile device. However, in other implementations, the wallet can be configured to execute on a mobile device while managing and storing the user's digital cash through financial institutions. Unlike paper money, digital cash can be sent over a data network (e.g., the Internet) via the secure transaction network system to any other user's wallet. When a user transfers digital cash to another user's wallet, the only record of the transaction is in the sender user's wallet and in the receiver user's wallet. In particular, the sender has an entry in their wallet indicating that they spent digital cash; but, the sender does not retain a specific record of where the digital cash was sent. Similarly, the receiver has an entry in their wallet indicating that they received digital cash; but, the receiver does not retain a specific record of from where the digital cash was received. As a result, the anonymity of the transaction is preserved.

In an example embodiment of the secure transaction network system, a user can configure their wallet to manage where and how the transaction records for a particular user are stored or backed up. In particular, the secure transaction network system does not keep any identifying records of a user's transactions. However, every user can use their wallet to configure the type of information to store for the particular user. In various example embodiments, user wallets can be configured with a variety of privacy settings to accommodate various levels of user data privacy. Further details of various example embodiments of the secure transaction network system are provided below with reference to the figures provided herewith.

Figure 1:
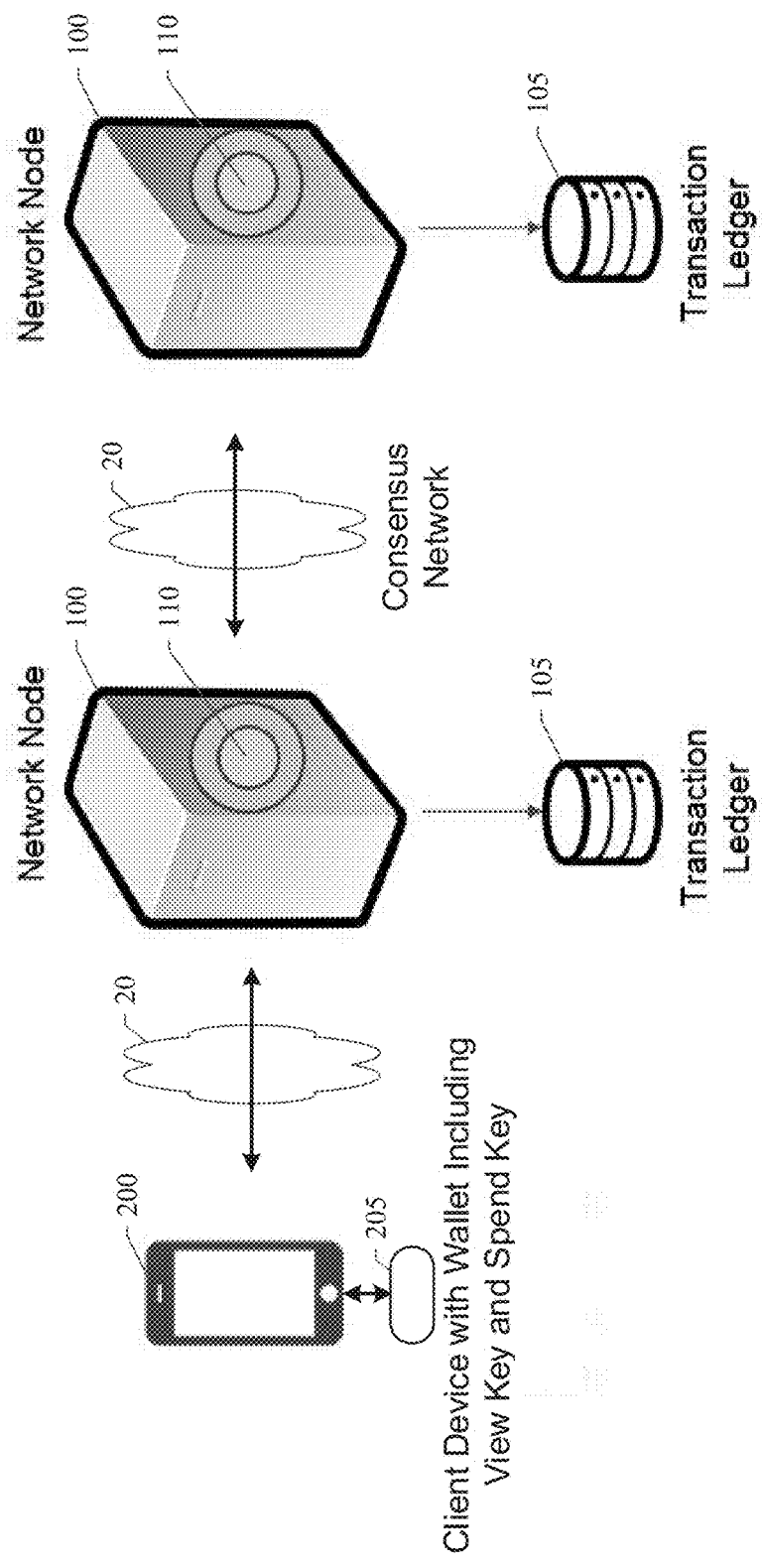
FIG. 1 illustrates an example embodiment of a secure transaction network ecosystem in which an example embodiment can be implemented.

Referring now to FIG. 1, an example embodiment of a secure transaction network ecosystem 10 in which an example embodiment can be implemented is illustrated. As shown in FIG. 1, the secure transaction network ecosystem 10 can include a plurality of distributed computing nodes or network nodes 100 in networked data communication with each other via network 20. The secure transaction network ecosystem 10 can also include a plurality of user or client platforms or client devices 200 in networked data communication with one or more of the network nodes 100 via network 20. Each client device 200 can include a wallet 205, which is a software component executing within the client device 200.

Network 20 can be configured to couple one computing device/node with another computing device/node in networked data communication. Network 20 may be enabled to employ any form of computer readable media for communicating information from one electronic device to another. For example, network 20 can include the Internet, other wide area networks (WANs), local area networks (LANs), direct connections, such as through a universal serial bus (USB) port, wireless data connections (e.g., WiFi, Bluetooth™, etc.), optic data connections, other forms of devices for the transfer of computer-readable media, or any combination thereof. On an interconnected set of sub-networks, including those based on differing architectures and protocols, a router and/or gateway device can act as a link between sub-networks, enabling messages to be sent between computing devices/nodes in a network ecosystem.

Network 20 may further include any of a variety of wireless sub-networks that may further overlay stand-alone or ad-hoc networks to provide an infrastructure-oriented connection. Such sub-networks may include mesh networks, wireless LAN (WLAN) networks, cellular networks, and the like. Network 20 may also include an autonomous system of terminals, gateways, routers, and the like connected by wireless radio links or wireless transceivers. These connectors may be configured to move freely and randomly and organize themselves arbitrarily, such that the topology of network 20 may change rapidly and arbitrarily.

Network 20 may further employ a plurality of access technologies including $2^{nd}$ (2G), 2.5, $3^{rd}$ (3G), $4^{th}$ (4G), $5^{th}$ (5G) generation network technologies, including radio access for cellular systems, WLAN, Wireless Router (WR) mesh, and the like. Access technologies such as 2G, 3G, 4G, 5G, and future access networks may enable wide area coverage for mobile devices, such as one or more of client devices 200, with various degrees of mobility. For example, network 20 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Network 20 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, network 20 may include virtually any wired and/or wireless data communication mechanisms by which information may travel between one computing device and another computing device, network, and the like.

Referring still to FIG. 1 for an example embodiment, a user or client platform represented as client device 200 can correspond to any type of client computing or communication device enabling a user to submit transaction requests or access transaction data provided by the secure transaction network 10 via the network 20. Client devices 200 may include virtually any computing device that is configured to send and receive information over a network, such as network 20. Such client devices 200 may include mobile or portable devices, such as, cellular telephones, smart phones, camera phones, display pagers, radio frequency (RF) devices, infrared (IR) devices, global positioning devices (GPS), Personal Digital Assistants (PDAs), handheld computers, wearable computers, tablet computers, Internet of Things (IoT) devices, integrated devices combining one or more of the preceding devices, and the like. The client devices 200 may also include other computing devices, such as personal computers (PCs), multiprocessor systems, microprocessor-based or programmable consumer electronics, network PC's, and the like. The client devices 200 may also include other processing devices, such as consumer electronic (CE) devices and/or embedded computing devices, which are known to those of ordinary skill in the art. As such, the client devices 200 may range widely in terms of capabilities, features, and resources. For example, a client device 200 configured as a basic cellphone may have a low-capability data processor, a numeric keypad and a few lines of monochrome LCD display on which only text may be displayed. In another example, a more sophisticated web-enabled client device 200 may have a more robust data processor, a higher level of memory resources, a touch sensitive screen, a stylus, and a full screen color LCD display in which both text and graphics may be displayed. Moreover, the web-enabled client device 200 may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The client device 200 may also include at least one client application that is configured to interact with the secure transaction network 10 via network 20. In an example embodiment, the client application can be a wallet 205 corresponding to a software module for execution by a data processor of the client device 200, the wallet 205 being configured to manage a user's digital cash and the secure transactions related thereto. In particular, the wallet 205 enables a user of a client device 200 to send and receive digital cash and related secure transactions via the secure transaction network 10.

Referring still to FIG. 1 for an example embodiment, the secure transaction network 10 can include a plurality of distributed computing nodes or network nodes 100 in networked data communication with each other and with client devices 200 via network 20. Each of the network nodes 100 can correspond to any type of secure computing device or secure computing environment enabling the secure processing of client transactions within the secure transaction network 10. In an example embodiment, network nodes 100 may include virtually any computing device that is configured to send and receive information over a network, such as network 20. Such network nodes 100 may include server computers, server farms, personal computers (PCs), PC arrays, multiprocessor systems, multi-computer systems, multiple core systems, microprocessor-based systems, single silicon wafer resident processors, multiple silicon wafer resident processors, quantum computing systems, and the like.

Each of the network nodes 100 of the secure transaction network 10 can include or be coupled with a transaction ledger 105 for storage of secure transaction data, key images, and related information. In an example embodiment, the transaction ledger 105 can be implemented as a secure data storage device, a database, a secure memory area or partition, or the like. Additional details of the information stored in the transaction ledger 105 are provided below and in connection with FIG. 27.

As shown in FIG. 1, the network nodes 100 of an example embodiment also include an internal secure computing environment or enclave 110. The enclave 110 represents a secure computing environment having: 1) an encrypted, isolated, and/or sequestered memory (e.g., random access memory or RAM); 2) isolated processing logic that cannot make or receive calls from an operating system (OS); and 3) an ability to attest to the authenticity and security of the secure computing environment upon request from a client device 200 or another network node 100. In a particular example embodiment, the enclave 110 can be implemented as an Intel® Corporation Software Guard Extensions (SGX) architecture. SGX is a set of central processing unit instruction code from Intel® that allows user-level code to allocate private regions of memory, called enclaves, which are protected from processes running at higher privilege levels. In the network nodes 100 with SGX enclaves 110 of the particular example embodiment, the network nodes 100 are configured to run with an SGX secure enclave 110. The SGX enclave 110 is isolated from the host OS in hardware-encrypted RAM, which prevents the network node 100 operator from having access into the enclave 110. SGX also supports a feature known as remote attestation, which allows a remote client or other external computing system to determine that a network node 100 is running a specific and authenticated software component inside an SGX enclave 110. The remote attestation can be performed over the network 20. By performing remote attestation of the enclaves 110 before establishing encrypted communication channels between network nodes 100, the entire transaction ledger 105 is configured to remain sealed within SGX enclaves 110 across the entire secure transaction network 10. As a result, the transaction ledger 105 can be distributed among all network nodes 100 of the secure transaction network 10; however, the contents of the transaction ledger 105 will never be accessible or viewable by humans, even the operators of the network nodes 100, as long as the SGX enclaves 110 and the secure transaction network 10 software remains secure. It will be apparent to those of ordinary skill in the art in view of the disclosure herein that secure enclaves 110 can be implemented with a secure computing environment other than Intel® SGX architecture.

FIGS. 2 through 9 illustrate an example embodiment of a system and method for initiating and managing secure transactions between a user of a client device 200 and the secure transaction network 10. In an example embodiment from the user's perspective, when the user (sender) with a client device 200 wants to send a transaction (e.g., a digital cash payment) to a recipient, the sender merely needs the public address of the recipient's wallet 205. The sender can choose the amount of the digital cash payment and initiate the transaction with client device 200. In the manner described in more detail below, the secure transaction network 10 accepts the sender's transaction and securely transfers the requested amount of digital cash from the sender's wallet 205 to the recipient with the designated recipient wallet address.

In an example embodiment, wallets 205 hold two important elements of information: a public address and private keys. A public address is like a user's PO Box at the post office and a private key is like the key that opens the user's PO Box. The user can give out or make public their PO Box number (or public address) so other people can send mail (or initiate transactions) with the user. However, the user keeps their private keys private so other people cannot open the user's PO Box (or access the user's wallet 205) without authorization.

When using the secure transaction network 10 of an example embodiment, the user wallet 205 stores the user's private keys on the user's client device 200. However, the secure transaction network 10 never has access to a user's private key, so the secure transaction network 10 can never access the user's wallet 205 or create transactions without user authorization. The secure transaction network 10 does not control the wallet 205 software executing on the client device 200. When using the secure transaction network 10, the user can use their wallet 205 to choose where and how to store their keys. The secure transaction network 10 is configured to process anonymized transactions from the client device 200 without having access to the wallet 205 on the client device 200.

In general, wallets 205 on client devices 200 have three main functions: maintaining a public address, securing user private keys, and storing user transaction records. The public address is an anonymized address corresponding to a particular wallet 205, which a user can use to receive transactions (e.g., digital cash payments). In an example embodiment, the wallet 205 manages two separate private keys: a view private key (herein the view key), and a spend private key (herein the spend key). The view key enables the user to view the user's transactions. The spend key enables the user to initiate spending transactions. The use of these private keys is described in more detail below. The public address for a particular wallet 205 is derived from the view key and the spend key using elliptic curve cryptography.

When a sender user of a client device 200 wishes to initiate a transaction with a recipient user of another client device 200 using the secure transaction network 10, the sender user must obtain and provide the public address of the recipient user's wallet 205. In a particular embodiment, the public address of the recipient user's wallet 205 can be a one-time use, anonymized public address or key for the transaction being initiated. In the particular embodiment, transactions may consist of one-time keys and one-time ring signatures based on a set of well-known technologies called CryptoNote™. A one-time key is a way for the sender to create an address that only the recipient can find and spend. A one-time ring signature is a way of anonymizing the ownership of any of the amounts attached to a particular one-time key.

One-time public keys are composed of the recipient's public address or key and an arbitrary random number selected by a sender. By using cryptography, the sender can create a key, which both the sender and the recipient can look up, but only the recipient can send (all without revealing the random number selected by the sender).

One-time ring signatures are composed of a set of transactions that all could possibly be the right amount to sum to the total the sender wants to send to the recipient and the authorization to spend enough digital cash to complete the transaction in the form of a key image. Key images are one-time ring signatures that only the recipient of a transaction can create. Once the one-time key and one-time ring signatures are ready, the sender user's wallet 205 can connect to a network node 100 of the secure transaction network 10 to transmit the pending transaction.

User wallets 205 of client devices 200 connect to network nodes 100, which form the secure transaction network 10. In the secure transaction network 10, network nodes 100 are configured to perform the processing of transaction propagation including transaction ledger 105 management and consensus. Network nodes 100 receive transaction requests from user wallets 205, check and verify that the transaction requests are well-formed and valid, and then propose the validated transaction requests to the secure transaction network 10. If other network nodes 100 of the secure transaction network 10 agree that the transaction is valid and should be committed and recorded in the transaction ledger 105, the transaction is added to the transaction ledger 105 and the recipient can subsequently spend the digital cash transferred as part of the valid transaction.

The network nodes 100 of the secure transaction network 10 are configured to operate with as little knowledge as possible. All communication between wallets 205 of client devices 200 and network nodes 100 takes place over secure channels so the communication cannot be read by network node 100 operators or by persistent monitoring of the communication channels. The network nodes 100 of the secure transaction network 10 are also configured to use secure enclave technology, described above, to ensure that specific and validated software is running within the enclave 110 of a particular network node 100 at a given moment. Whenever a wallet 205 connects to a network node 100, the wallet 205 causes a remote attestation of the software running within the enclave 110 of the network node 100 with an independent party or attestation service. The remote attestation is a check to ensure that the software running within the enclave 110 of the network node 100 is validated. If a network node 100 fails this challenge, the wallet 205 will not send any transactions to the network node 100.

Once a network node 100 has been verified, a transaction with a wallet 205 of a client device 200 can begin. In a transaction, the wallet 205 creates a proposed entry for the transaction ledger 105. In an example embodiment, the proposed entry can consist of a one-time public key and a one-time ring signature or key image as described above. The wallet 205 can send the proposed entry corresponding to the transaction to a network node 100 over a secure communication channel via network 20. The network node 100 receives the transaction and performs a validation check of the transaction from inside of the network node's enclave 110. The validation check verifies two features: 1) if the one-time public key of the received transaction already exists in the transaction ledger 105, and 2) if the one-time key image of the received transaction already exists in the transaction ledger 105. If neither the one-time public key nor the one-time key image are in the transaction ledger 105, the network node 100 proposes the transaction to the secure transaction network 10 in a ballot or nomination. If other network nodes 100 of the secure transaction network 10 agree that the transaction is valid, the transaction output is committed and recorded in the transaction ledger 105 and the one-time key images become burned meaning that the key images can't be used again. All other information related to the transaction can be discarded. At this point, the recipient can look up which transaction outputs belong to them in the transaction ledger 105 and spend them by calculating the one-time private key that corresponds to the one-time public key the sender created for them. Note that in the example embodiment, there is no information that ties or connects a specific burned key image to a specific transaction output. However, if a burned key image is already present in the transaction ledger 105, the digital cash tied to that key cannot be spent again. This is how the transaction ledger 105 can prevent double spends without knowing which transaction is being attempted again.

User transactions (e.g., payments) with the secure transaction network 10 of an example embodiment are initiated by wallets 205 on a sender client device 200, validated and added to the transaction ledger 105 by the network nodes 100, and made available to spend by a recipient client device 200 with their wallet 205. The process in an example embodiment begins with a sender wallet 205 initiating a transaction by establishing a secure channel in the secure transaction network 10. FIGS. 2 through 6 illustrate an example embodiment of a system and method for establishing a secure channel in the secure transaction network 10.

Figure 2:
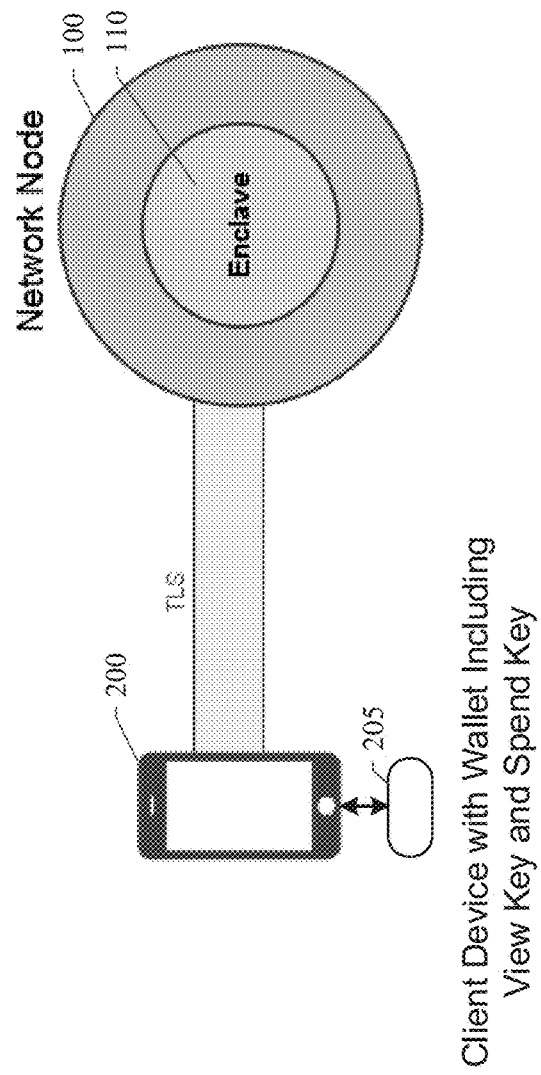
FIGS. 2 through 6 illustrate an example embodiment of a system and method for establishing a secure channel in the secure transaction network.

Referring to FIG. 2, the sender wallet 205 of client device 200 can establish a remote procedure call (RPC) with a network node 100. The RPC can establish a connection with the network node 100 using Transport Layer Security (TLS). The TLS protocol is a well-known protocol that aims primarily to provide privacy and data integrity between two or more communicating computer applications. Initially, the sender wallet 205 communicates with untrusted server code in the network node 100. As described above, a public address or key of the recipient wallet 205, a private view key of the sender, and a private spend key of the sender are maintained in the sender wallet 205.

Figure 3:
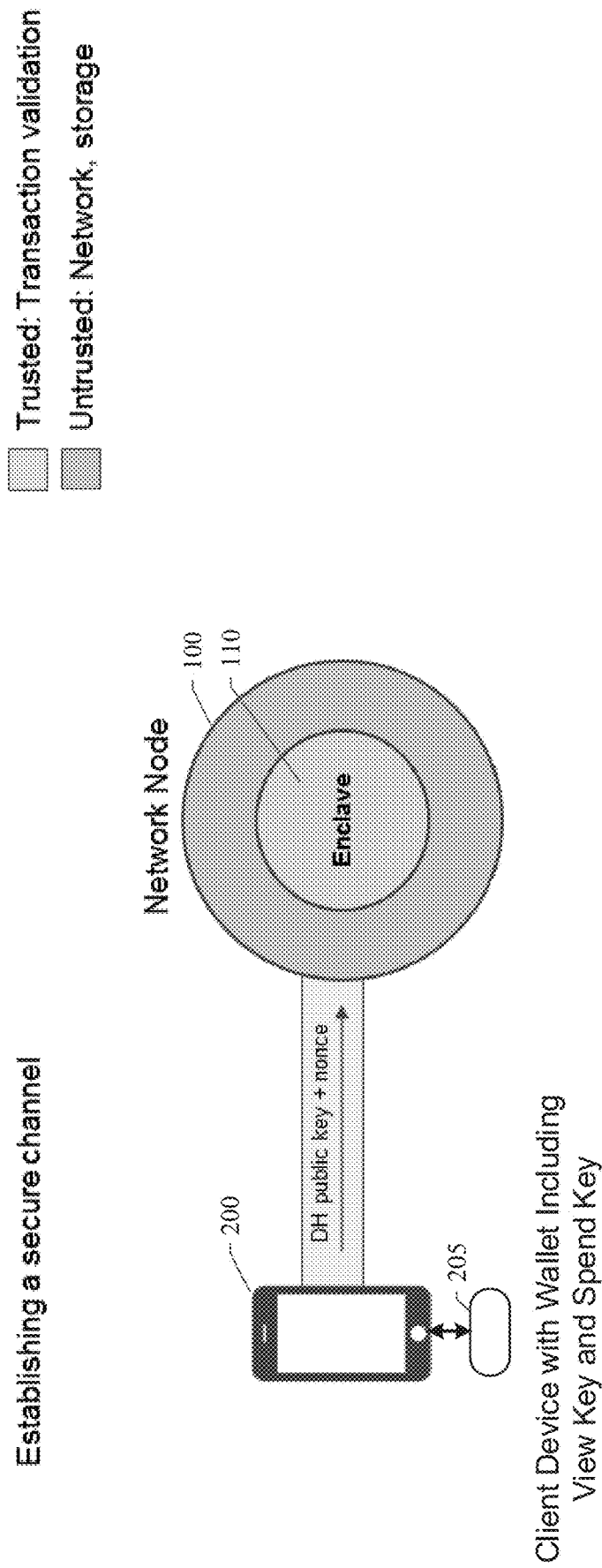

Referring to FIG. 3, the sender wallet 205 of client device 200 can initiate a private session by generating an ephemeral Diffie-Hellman (DH) key and a nonce. The use of DH keys is a well-known process used to establish a shared secret between two parties. In cryptography, a nonce is an arbitrary number that can be used just once in a cryptographic communication. A nonce is often a random or pseudo-random number generated for a private communication to ensure that old communications cannot be reused in replay attacks. The combination of the DH key and the nonce creates a one-time use key used by the sender wallet 205 to attest the authenticity of the enclave 110 of the network node 100 and to create a session secret for the secure communication between the wallet 205 and the enclave 110 of the network node 100. The one-time use key is sent by the wallet 205 to the untrusted code of the network node 100.

Figure 4:
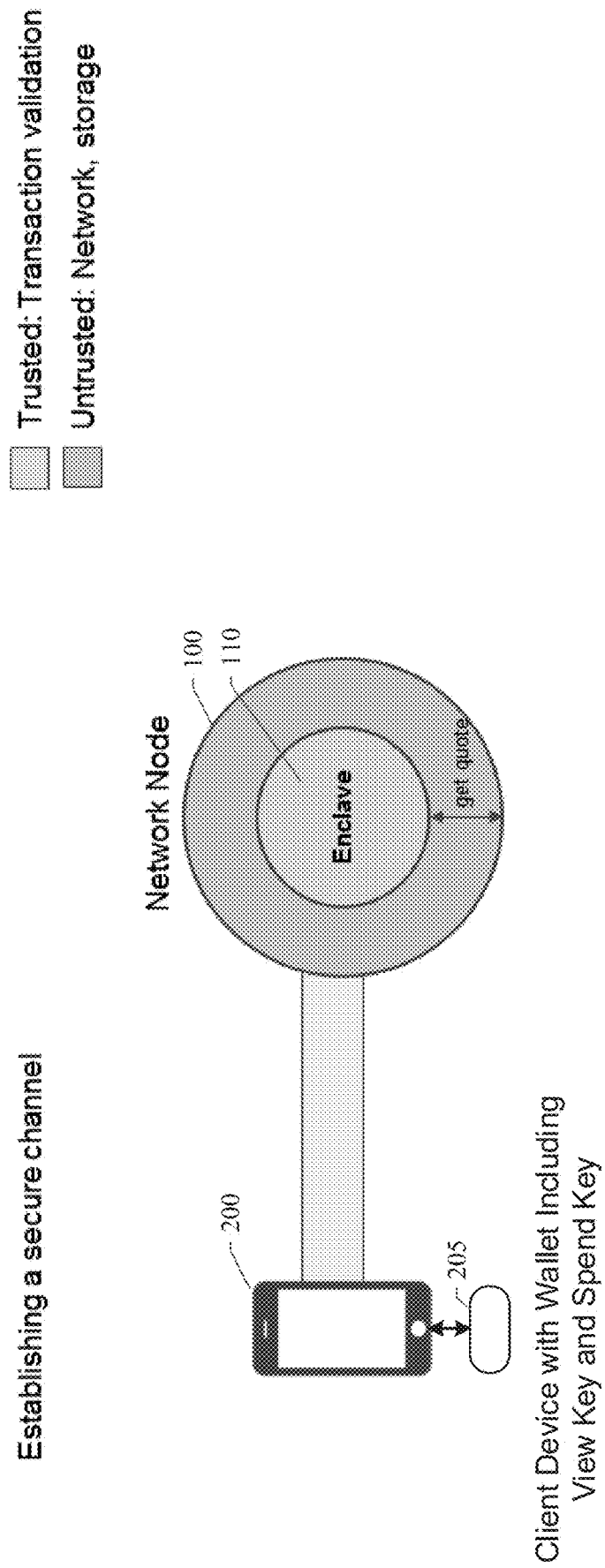

Referring to FIG. 4, the untrusted code of the network node 100 receives the one-time use key sent by the wallet 205. The receipt of the one-time use key causes the untrusted code of the network node 100 to generate a quote request, which is sent to the enclave 110 of the network node 100 from the untrusted code. The quote request causes the enclave 110 to perform a remote attestation with an independent party or attestation service as shown in FIG. 5.

Figure 5:
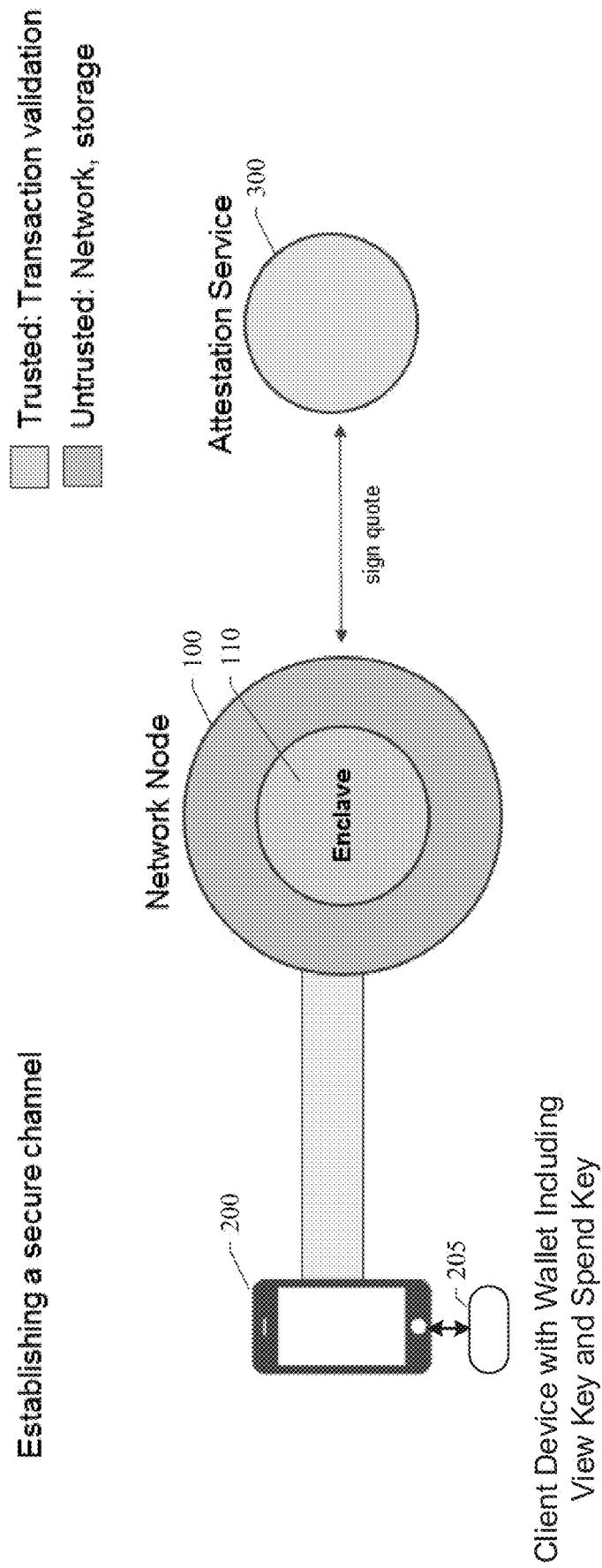

Referring to FIG. 5, the enclave 110 uses the quote from the quote request in a secure communication with an attestation service 300 to perform a remote attestation of the enclave 110 with an independent party. The remote attestation is a check to ensure that the software running within the enclave 110 of the network node 100 is a specific and validated executable component. If the attestation service 300 can validate the enclave 110 executable component, the attestation service 300 signs the quote and sends the signed quote back to the enclave 110. If the network node 100 fails this remote attestation challenge, the session fails and the sender wallet 205 is notified to not send any transactions to the network node 100.

Figure 6:
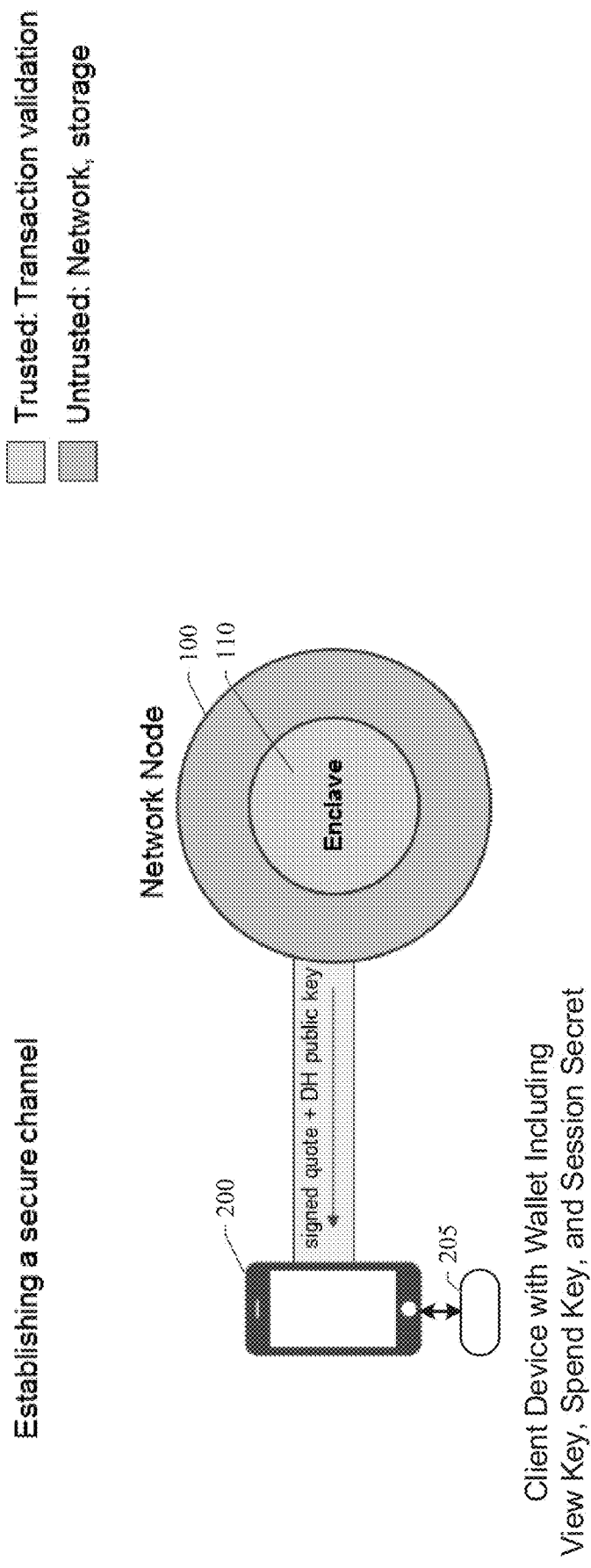

Referring to FIG. 6, assuming the attestation service 300 can validate the enclave 110 executable component, the enclave 110 receives the signed quote from the attestation service 300. The signed quote along with the DH key can be used by the network node 100 to generate a session secret/key to enable the secure channel with the sender wallet 205. The session secret can be sent from the network node 100 to the sender wallet 205. The session secret assures the wallet 205 that the wallet 205 is communicating on a secure communication channel with a validated enclave 110 of the network node 100. This session secret, and the secure channel enabled thereby, can be used by the wallet 205 for subsequent communications with the network node 100.

Figure 7:
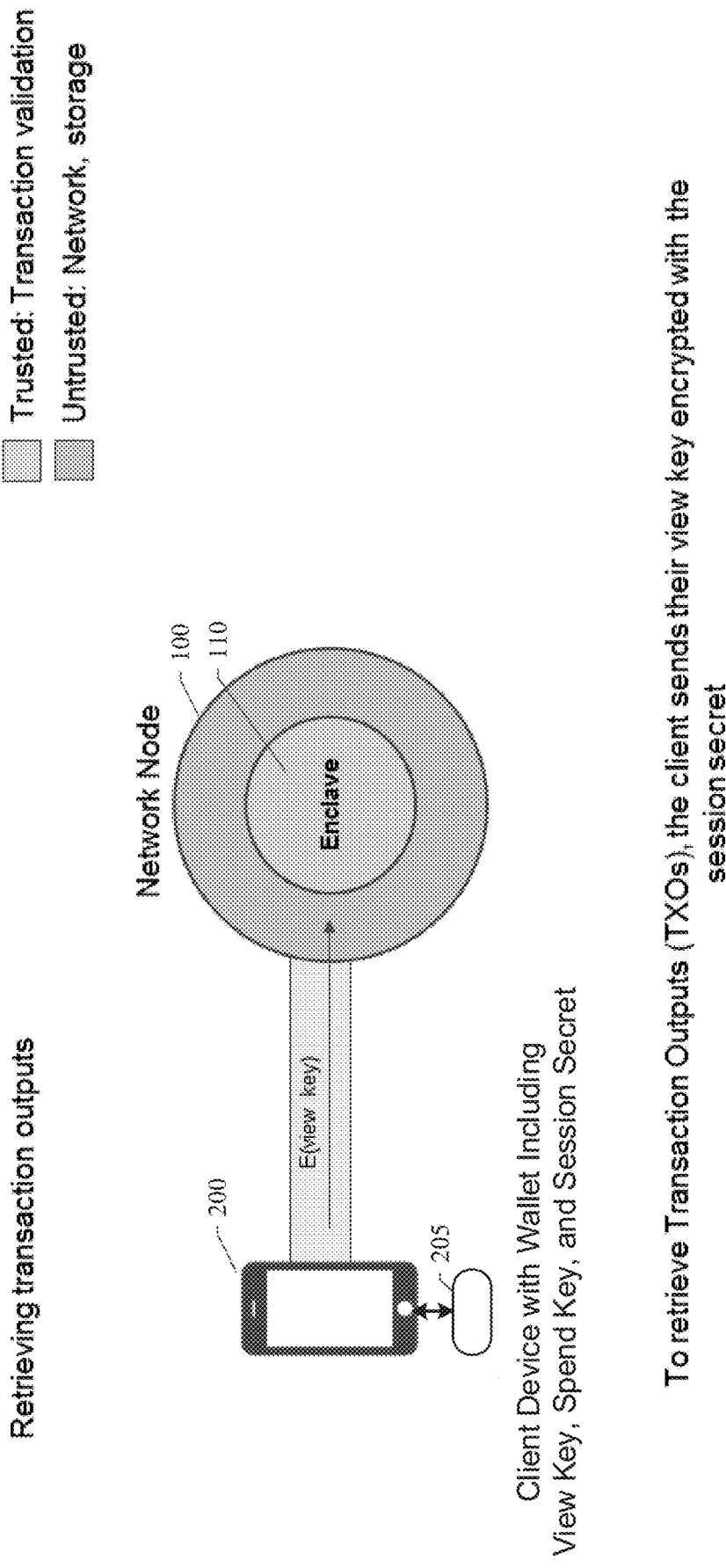
FIGS. 7 through 9 illustrate an example embodiment of a system and method for retrieving transaction outputs in the secure transaction network.
Figure 8:
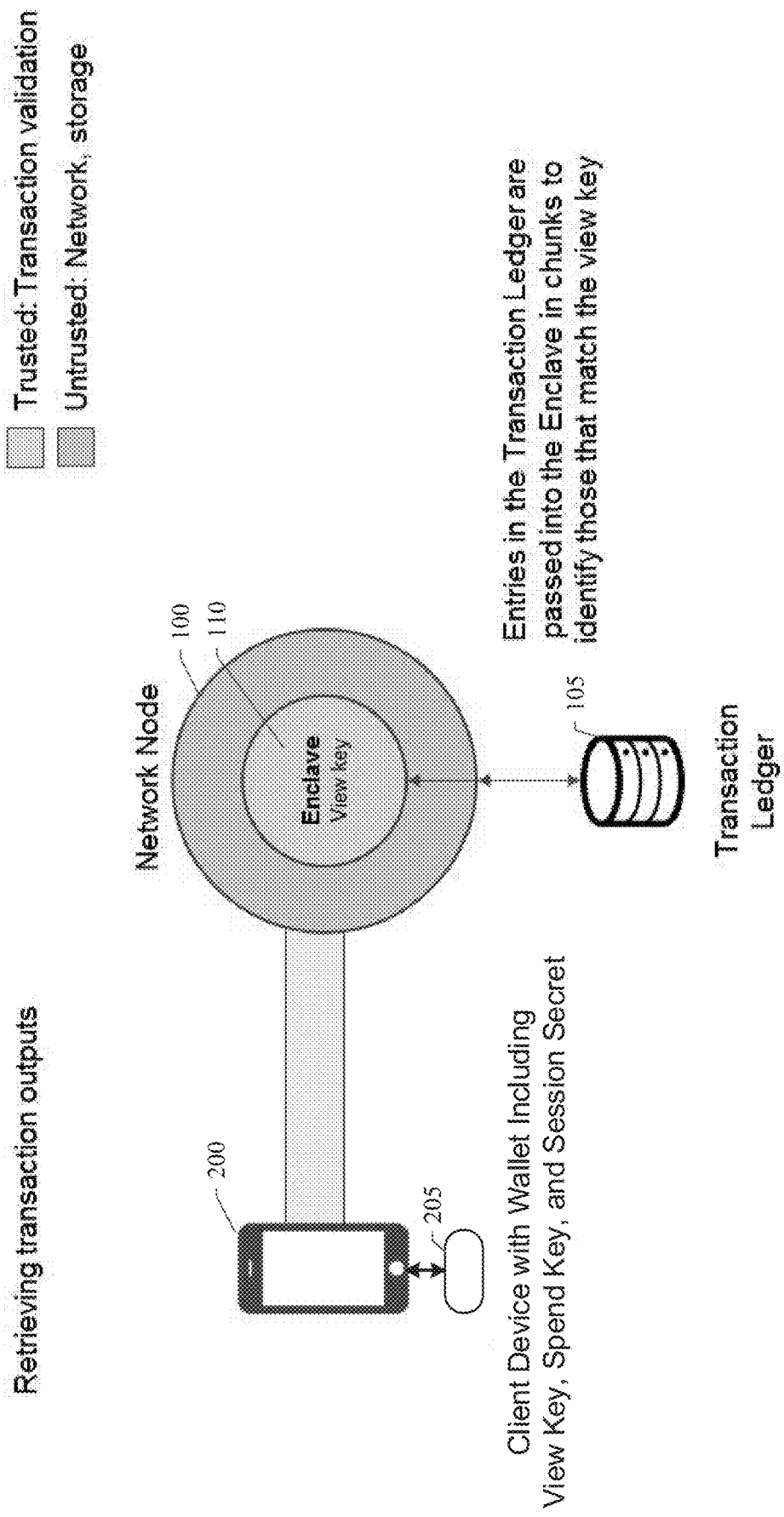
Figure 9:
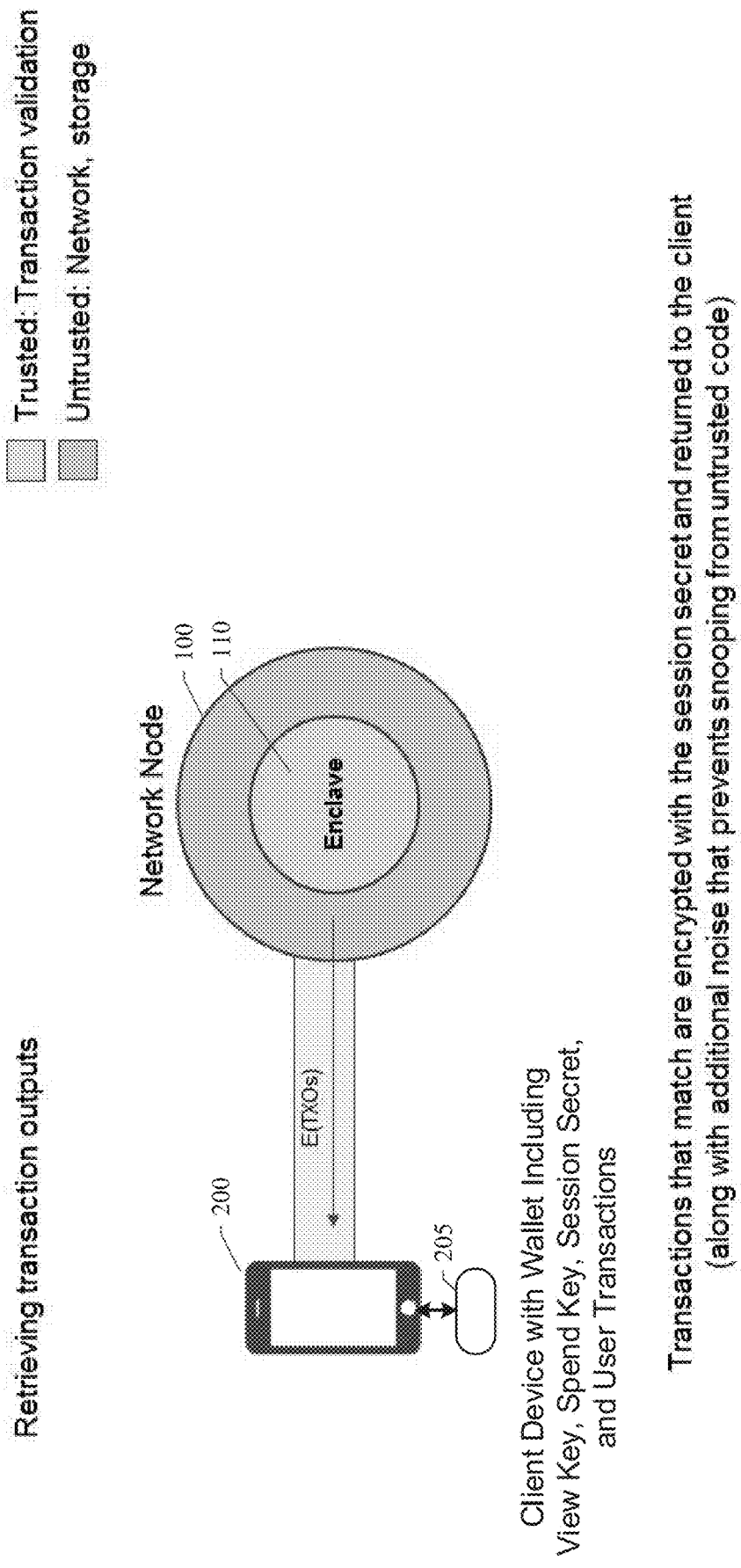

Once the wallet 205 has established a secure channel with a network node 100 as described above, the wallet 205 can begin to make transaction requests and retrieve transaction output from the network node 100. FIGS. 7 through 9 illustrate an example embodiment of a system and method for retrieving transaction outputs in the secure transaction network 10.

Referring to FIG. 7, the wallet 205 can generate a transaction request to the network node 100 by encrypting the view key with the session secret. This encrypted view key is sent to the network node 100 via the secure communication channel. The encrypted view key enables the wallet 205 to retrieve transaction outputs (TXOs) from the network node 100.

Referring to FIG. 8, the verified enclave 110 of the network node 100 receives the encrypted view key from the wallet 205. Given the shared session secret, the enclave 110 can decrypt the view key. In a secure communication with transaction ledger 105, the enclave 110 can use the view key to identify entries in the transaction ledger 105 that match the view key. The matching entries can be passed from the transaction ledger 105 to the enclave 110. Alternatively, groups or chunks of transaction ledger 105 entries can be passed into the enclave 110 to identify those that match the view key.

Referring to FIG. 9, entries in the transaction ledger 105 that match the view key can be encrypted by the enclave 110 with the session secret. The matching encrypted transactions (TXOs) can be sent to the wallet 205 via the secure communication channel. Noise data (meaningless data) can be added to the transfer of the TXOs to obfuscate the transmission and prevent snooping from untrusted code. The wallet 205 can use the session secret to decrypt the retrieved TXOs. At this point, the user transactions corresponding to the user's view key can be managed in the user's wallet 205.

Thus, the secure transaction network 10 of the example embodiments as described herein enables users to use client devices 200 to view and initiate transactions to transfer value as digital cash between users. All necessary transaction detail and history is stored in the transaction ledger 105. A copy of the transaction ledger 105 can be maintained by each of the network nodes 100 of the secure transaction network 10. The information stored in the transaction ledger 105 of an example embodiment can include: 1) transaction outputs, and 2) key images. Transaction inputs and signatures are not stored to increase the security and efficiency of the secure transaction network 10. For the transaction outputs, the transaction ledger 105 can also store one-time target keys, transaction public keys, and the amount or value associated with the transaction. The key images are stored in a manner that does not tie or connect the key images to the corresponding transaction outputs. Moreover, the link between transaction inputs and transaction outputs exists only on the originating client devices 200 and within the enclave 110 of the network nodes 100. These features improve the security and efficiency of the secure transaction network 10.

In the secure transaction network 10 of an example embodiment, transaction processing can be completed rapidly (e.g., in seconds or portions thereof). All transaction and balance information is kept private within the secure enclaves 110 of the network nodes 100 such that the transactions themselves are never visible to the operators of the network nodes 100. Transaction privacy is further protected with one-time public keys and one-time ring signatures. Even if an attacker is able to forge or copy an enclave signature in order to connect to the secure transaction network 10 with modified software/malware, the network node 100 operator and any attackers who may compromise a network node 100 will never have access to a user's private keys or any private user data; because, all user private keys and private user data are resident in the user's wallet 205 and never touches the secure transaction network 10. As a result, the secure transaction network 10 of the various example embodiments described herein is secure, efficient, rapid, and supports user-friendly secure transactions, especially on mobile applications and mobile devices.

The secure transaction network 10 of the various example embodiments described herein can be used in a wide variety of applications and vertical markets. For example, specific embodiments can be applied to online payment processing systems, financial asset management systems, crypto-currency systems, secure online digital content delivery systems, digital rights management systems, digital asset management systems, smart contract (e.g., ERC-20) systems, voting systems, merchant payment systems, or the like. It will be apparent to those of ordinary skill in the art in view of the disclosure herein that other applications of the technology and innovations disclosed herein are possible.

A System and Method for Oblivious Information Retrieval

In some cases, adversaries, hackers and the like, can discover patterns of execution or transactions even when data elements are encrypted. This threat can be particularly problematic during transaction read and write operations between a user device and the transaction/recovery ledger. In the various example embodiments described herein, transaction read and write operations are performed in a manner to prevent correlation of a TXO with a particular user. In other words, the example embodiments enable oblivious information retrieval. Moreover, the example embodiments enable oblivious information retrieval in a lookup service that can return all or some portion of transactions for a given user in less than $O(N)$ time per user, where N is the size of the ledger.

In an example embodiment that implements oblivious information retrieval, the recovery ledger can be organized in a way that is different from the traditional public ledger. In a particular example embodiment, an Account Index (described below) can be used as a transaction data structure, which is provided with an Account Service served by a View Node. The Account Service implemented by a View Node 410 in an example embodiment is illustrated in FIG. 10.

Figure 10:
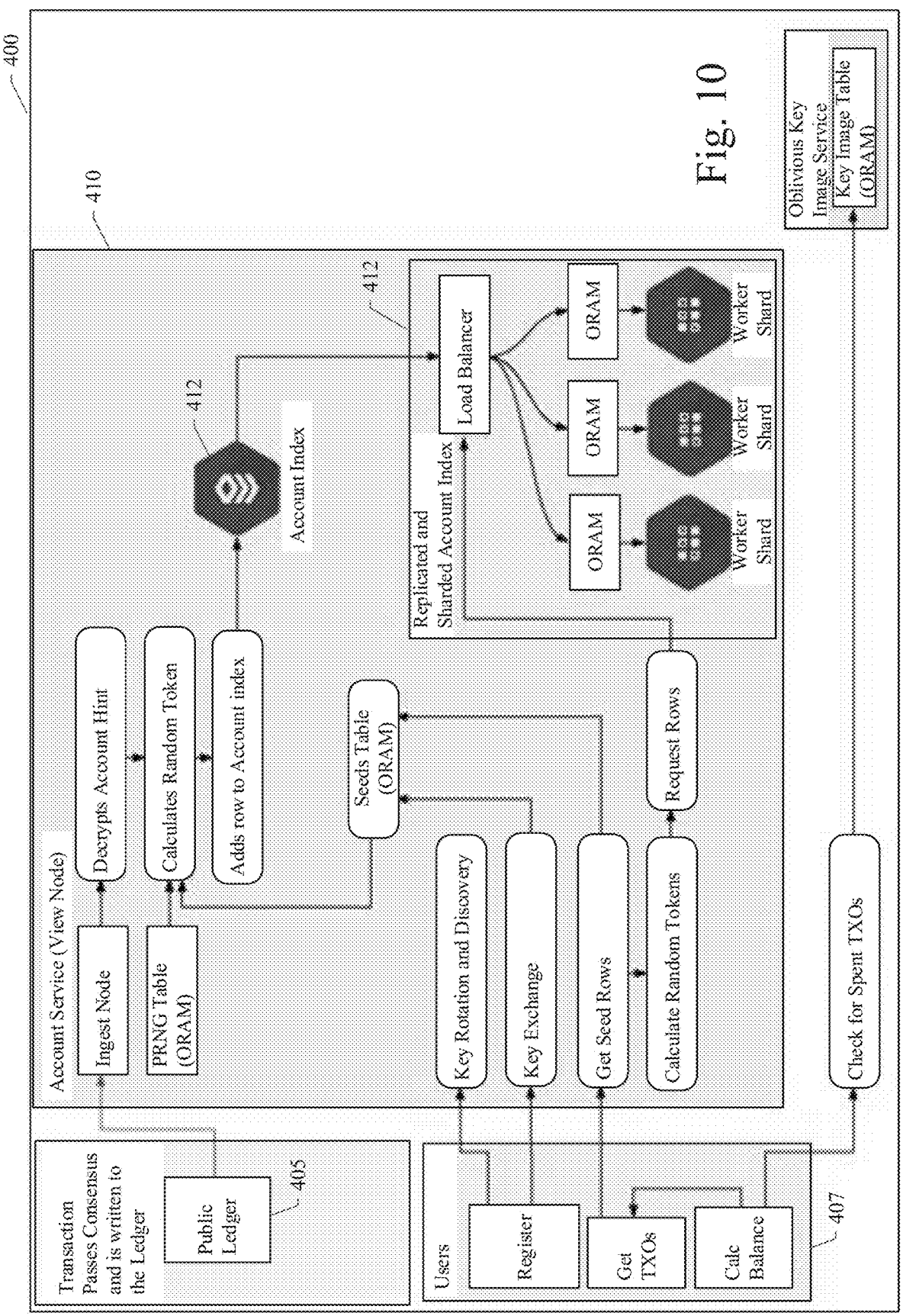
FIG. 10 illustrates a system diagram of an example embodiment showing interactions between system elements for processing user requests and transactions in an oblivious information retrieval system.

FIG. 10 illustrates a system diagram of an example embodiment showing interactions between system elements for processing user requests and transactions in an oblivious information retrieval system 400. In particular, FIG. 10 illustrates an Account Index transaction data structure 412, which is provided with an Account Service served by a View Node 410. In the example embodiment, the Account Index data structure 412 is a key-value store, which can be horizontally scaled (e.g., sharded across several machines or computing devices). The horizontally-scaled TXO server can be denoted as the View Node 410. As shown in FIG. 10, transactions originated by users can be submitted to the network nodes 100, validated by consensus, and written to the public ledger 105/405 as described above. When a transaction is written to the public ledger 405, an Ingest node/server of the Account Service can process the transaction and produce a key and value. In particular, the Ingest node/server can obtain a Cryptonote one-time recipient address, and transaction details from the public ledger 405, the transaction details including an input ring, Merkle proof, and other transaction data. Additionally, an account hint can be obtained as a combination of the recipient's public view key with the recipient's public find key and an encryption of the keys with the account server's public key.

As shown in FIG. 10, the Ingest node/server can decrypt the account hint and generate a random token from the decrypted account hint and a value from a pseudorandom number generator (PRNG) table implemented in an oblivious random access memory (ORAM). A PRNG table is the result of a process for generating a sequence of numbers whose properties approximate the properties of sequences of random numbers. The PRNG-generated sequence is not truly random, because it is completely determined by an initial value, called the PRNG's seed (which may include truly random values). An oblivious random access memory (ORAM) is a data storage methodology configured to transform data/executables to preserve the input/output behavior of the original algorithm, but to transform the distribution of memory access patterns to be independent of the memory access pattern of the original algorithm. The use of ORAMs is motivated by the fact that an adversary can obtain non-trivial information about the execution of a program and the nature of the data being processed, just by observing the pattern in which various locations of memory are accessed during its execution. An adversary can get this information even if the data values are all encrypted. Thus, as shown in FIG. 10, the Ingest node/server of the Account Service can use a value from the PRNG table in ORAM memory to obfuscate the resulting random token. A seed value from a Seeds Table, also implemented in ORAM memory, can also be used to seed the PRNG. This obfuscated token can serve as the key of the key/value pair produced by the Ingest node/server and used to populate a row corresponding to a transaction in the Account Index data structure 412. The value of the key/value pair can be the full transaction output details, encrypted with the user's public key. The key/value pair can be thereby added/appended to the Account Index 412 as a row to represent the newly written transaction. In the example embodiment shown in FIG. 10, the Account Index data structure 412 can be replicated and sharded across a plurality of worker shards implemented in ORAM memory. As such, the Account Index data structure 412 can be a key-value store, which can be horizontally scaled or sharded across several machines or computing devices.

Figure 11:
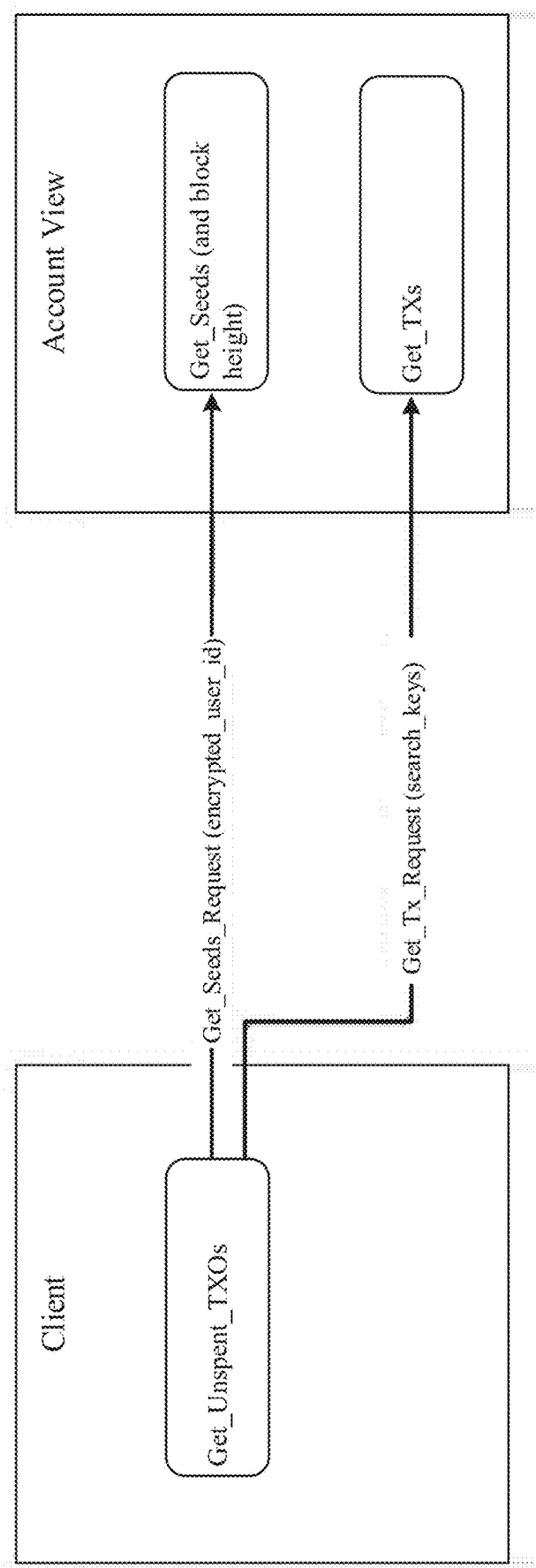
FIG. 11 illustrates an example embodiment of the elements of a transaction output (TXO) request.

For a client/user request to read data from the Account Index 412, the client must reconstruct the tokens for which the client will query the Account Service Ingest node. In particular, the client can maintain the following data: Root Entropy (from which to derive Cryptonote KeyPairs), an Account Server Public Key, Seeds (e.g., reconstructable from Public Keys), PRNG state (e.g., reconstructable from the seed and sending queries to the View Node), Previous Transactions, and Seeds and PRNGs (from the View Node). In an example embodiment, a read request to the View Node 410 involves the following steps: get seeds from the View Node (or use cached seeds), use the seeds to calculate tokens as PRNG outputs (or use cached tokens), and use the tokens to request the View Node to send the TXOs corresponding to the tokens. The seed request to the View Node contains the user's public view key and the user's public find key (encrypted with the account server's public key). This is the same identifying information as what is encrypted in the account hint field in the transaction. The client can now use the seeds to calculate the tokens with which the client will be sending a request to the View Node. In a particular example embodiment, the token can be computed as token=PRNG(seed). The PRNG process is known, and the seed can be stored on a mobile device, such as a mobile phone. In the case of wallet recovery, the client can start at the seed and then iterate through the PRNG Output (tokens) until the View Node replies with a "Not Found" response. The request for TXOs can contain: random numbers corresponding to transaction outputs, and the maximum block height of the client's stored transactions and previous queries. An example of these requests is shown in FIG. 11. FIG. 11 illustrates an example embodiment of the elements of a transaction output (TXO) request.

Figure 12:
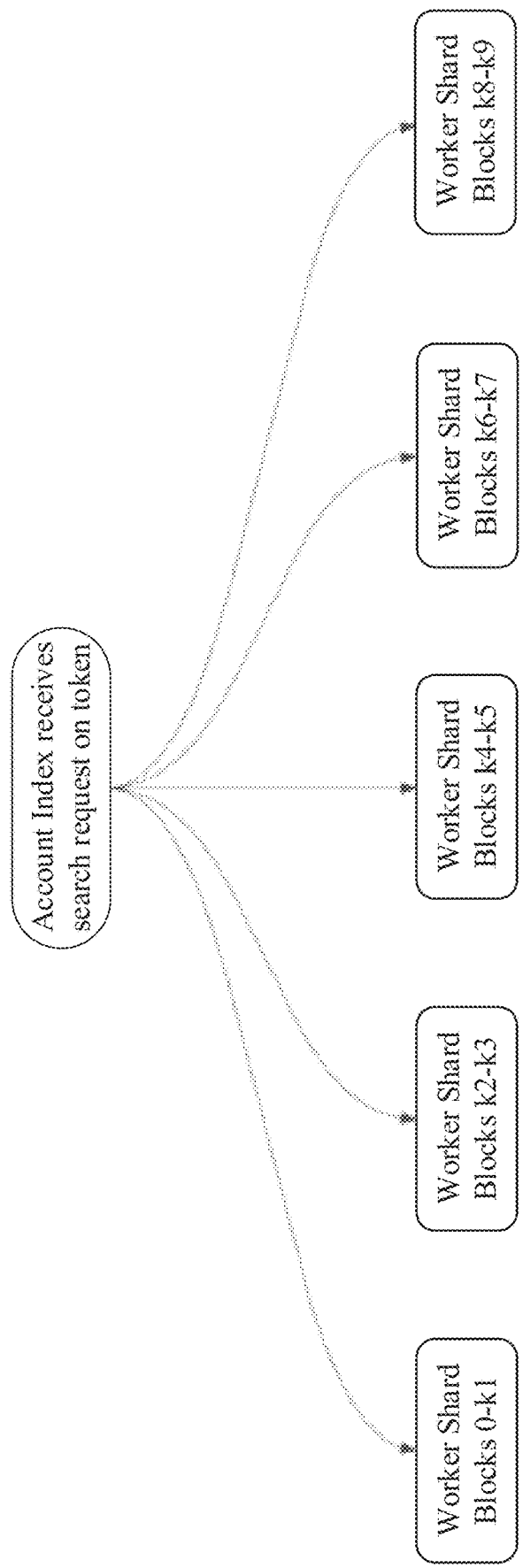
FIG. 12 illustrates an example embodiment of the View Node distributing the TXO search request to each of its shards, in order to access the distributed Account Index data structure.

When the View Node 410 receives the TXO request as described above, the View Node 410 can access the Account Index data structure 412 by distributing the request to each of the worker shards. This step is shown by example in FIG. 12. FIG. 12 illustrates an example embodiment of the View Node 410 distributing the TXO search request to each of its worker shards, in order to access the distributed Account Index data structure 412. Each worker shard then searches for the token in its subset of transactions. A number of data structures could be used to store the data on each worker shard. For example, a hashmap could provide an O(1) lookup per shard; but, this process would leak the memory address of the tokens being requested through memory access patterns. This could be de-anonymizing if a row being added to the Account Index at a given transaction (block) in the public ledger is observed, and then the Account Index is observed writing to an address in memory, which is later served in response to a request for TXOs. This process confirms with high confidence that that user was the recipient of that requested TXO. To prevent this memory address leakage, the example embodiment incurs a small performance cost in order to provide oblivious lookup of the tokens as described below.

In an example embodiment providing oblivious lookup of the tokens, a sharding process can be implemented in view of the following concerns: Adding a new shard should incur a constant (trivial) cost (e.g., not reshuffling the data on all shards); It should not be possible for a malicious series of requests to isolate a single user to a particular shard (particularly if the lookup incurs more cost on the shard that has to return the value for a key-hit); Rebalancing should be rare (or non-existent) with proper redundancy; and Returning to the "reducer" (whatever is consolidating the worker shards' results) should not reveal anything about what the user requested, or which user requested it.

Figure 13:
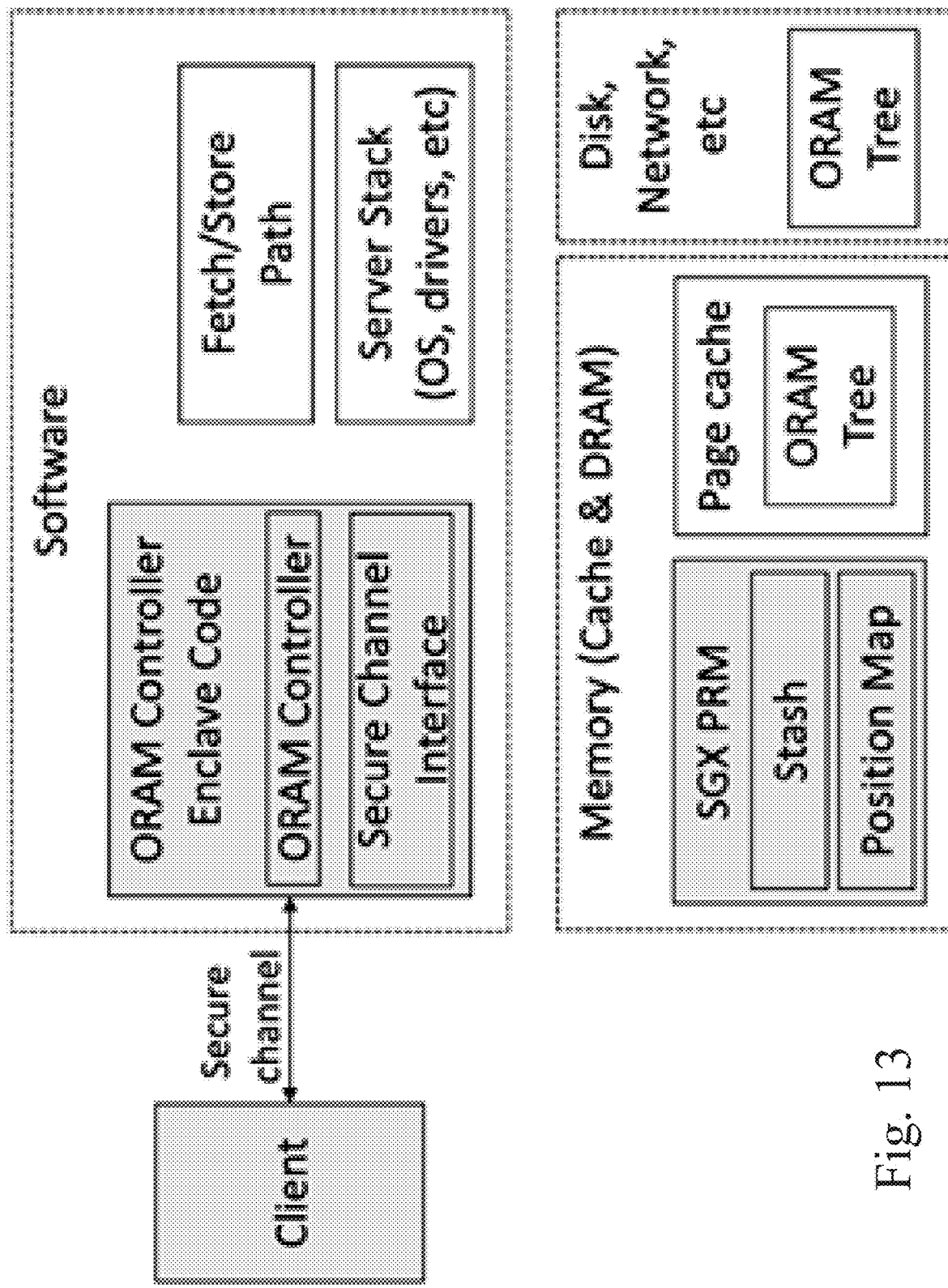
FIG. 13 illustrates an example embodiment of a system architecture showing the use of oblivious RAM (ORAM) with a secure processing enclave for each worker shard.

In an example embodiment, shards can be processed chronologically with rows added to the Account Index. For example, a new shard can be created once a row reaches a pre-determined threshold (e.g., a few GB, or whatever can be comfortably maintained in the enclave). In some cases, primitives can be used to implement ORAM outside of the enclave. In the example embodiment described herein, ORAM for the Account Index 412 can be implemented in the trusted enclave 110 (e.g. SGX) on each worker shard. An example embodiment is shown in FIG. 13. FIG. 13 illustrates an example embodiment of a system architecture showing the use of oblivious RAM (ORAM) with a secure processing enclave for each worker shard. The trusted components are shown shaded. Because the trusted enclave does not have system calls, the untrusted operating system (OS) is used to handle page faults and network calls.

Figure 14:
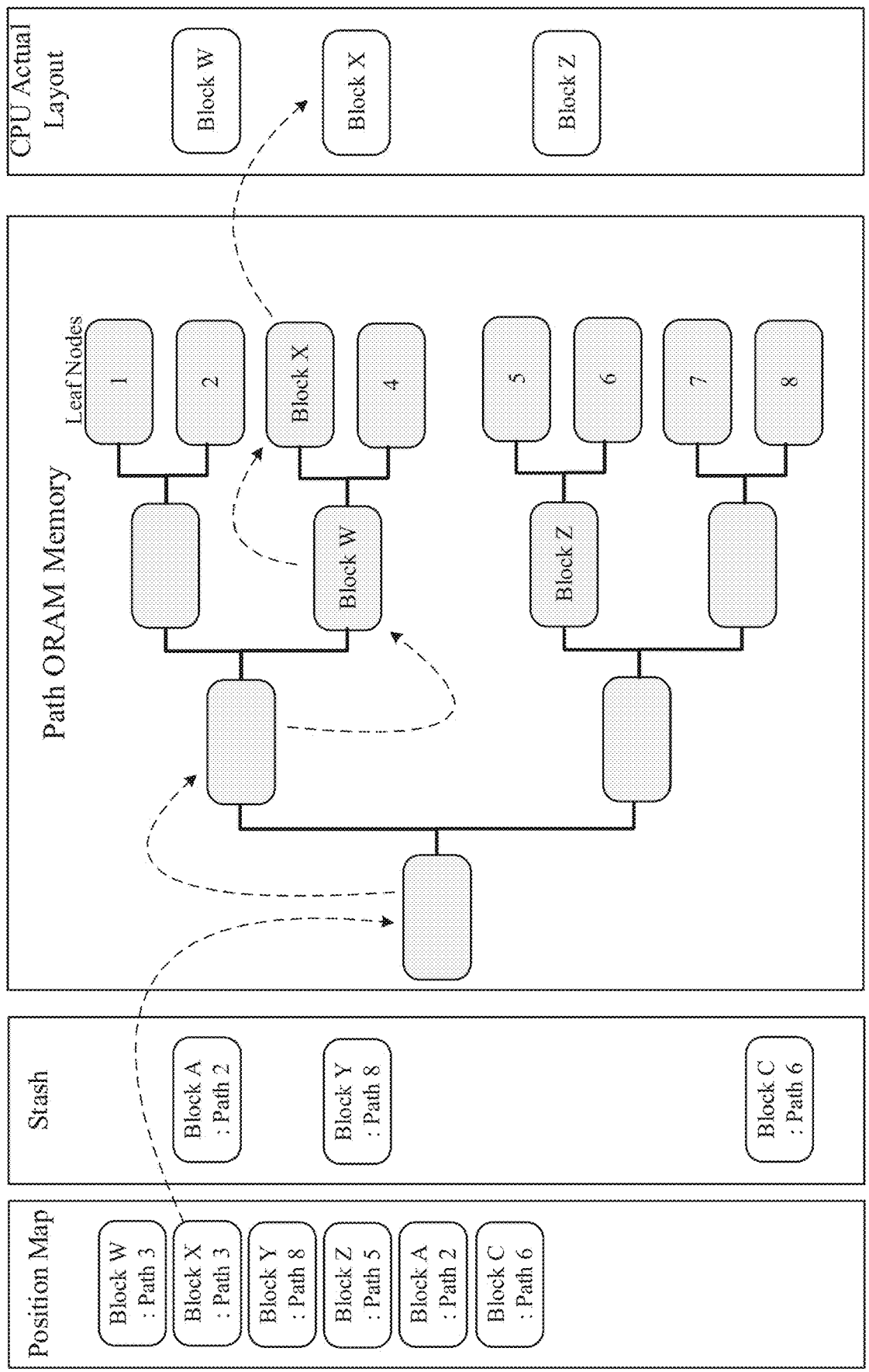
FIG. 14 illustrates an example embodiment of tree-based ORAM (e.g., PATH ORAM) to map data blocks to random paths.

In the example embodiment, a tree-based ORAM access structure, such as PATH ORAM can be used. For example, FIG. 14 illustrates an example embodiment of tree-based ORAM (e.g., PATH ORAM) to map data blocks to random paths. In the example embodiment, each block is mapped to a random path, which ends in a leaf. If a block is on that path according to the position map, the block is either on that path or in the stash. To access any block, the system and method of an example embodiment can look up the path (e.g., read every block on the path). In some cases, a least common ancestor can be identified. Then, the path is written to the stash. The block is put on a random path and the stash is written back to the path and packed as closely to the leaf as possible. As a result, an adversary only sees access to a uniform-random sequence of leaves, independent of the actual access pattern. The position map can be stored as a smaller Path ORAM.

Figure 15:
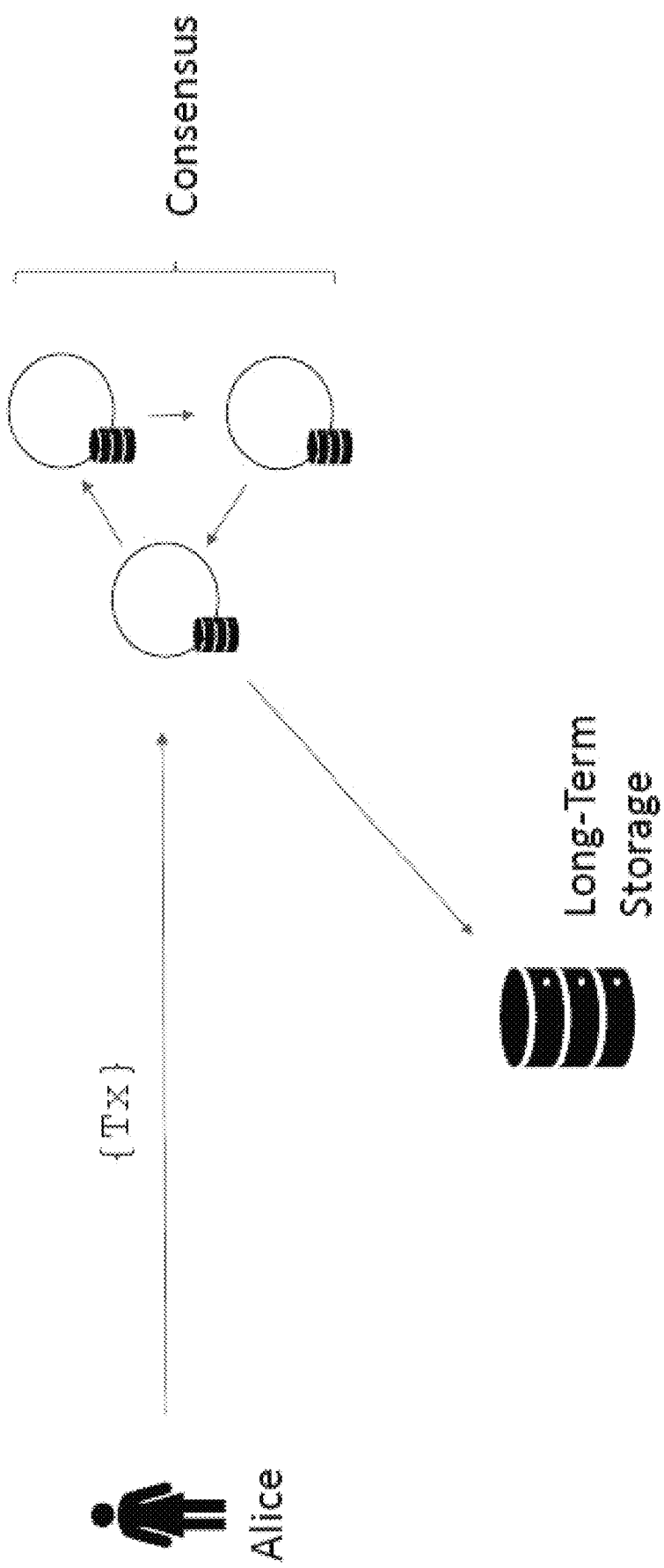
FIGS. 15 through 16 illustrate examples of interactions between users, the secure network, the view node, and long term data storage in an example embodiment.
Figure 16:
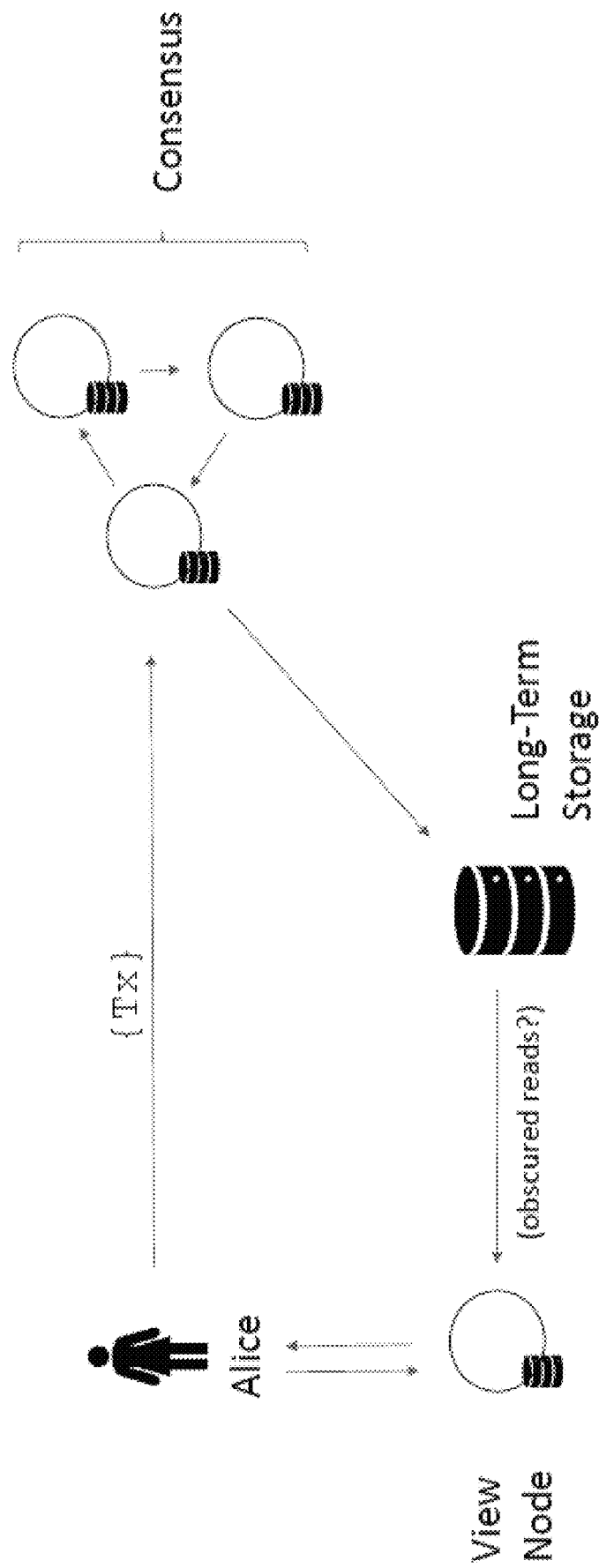

FIGS. 15 through 16 illustrate examples of interactions between users, the secure network, the view node, and long term data storage in an example embodiment. In an example of the basic process shown in FIG. 15 for a client request to access a transaction in the secure transaction network, a client user (e.g., Alice) can issue a request to the consensus network. An example embodiment can use a consensus network protocol to nominate their respective transactions to the secure transaction network shown in FIG. 15. In a particular embodiment, the consensus network protocol can be implemented with the well-known Stellar Consensus™ Protocol (SCP), which provides a way for a set of network nodes to reach consensus on a set of transactions without relying on a closed system to accurately record transactions, including financial transactions. It will be apparent to those of ordinary skill in the art in view of the disclosure herein that other alternative consensus network protocols may also be used. In the basic process shown in FIG. 15, the transaction can be committed to long-term storage once the consensus process is completed.

In an example of the process with a View Node as shown in FIG. 16, the client user (e.g., Alice) can issue a request to the View Node for access to a transaction stored in long-term storage by the secure transaction network. As described above the client access to the stored transaction via the View Node can be accomplished using oblivious information retrieval in which the data access is not discoverable by third parties.

FIGS. 17 through 27 illustrate examples of interactions between client users, the secure network, the account server, the recovery ledger, and the wallet server in an example embodiment. In the examples shown, a client user (e.g., Bob) signs up for an account service and publicizes his use of this service. Another client user (e.g., Alice) encrypts an account hint for the service and attaches the account hint to a transaction (Tx). The service uses the account hints, decrypts them, and adds records to the recovery ledger as described above. The hints allow the service to do O(1) work per transaction even if they support n users. Later, a recovery node can be used to quickly recover the client user's (e.g., Bob) wallet, find his recent transactions, or alert him when new transactions appear.

Figure 17:
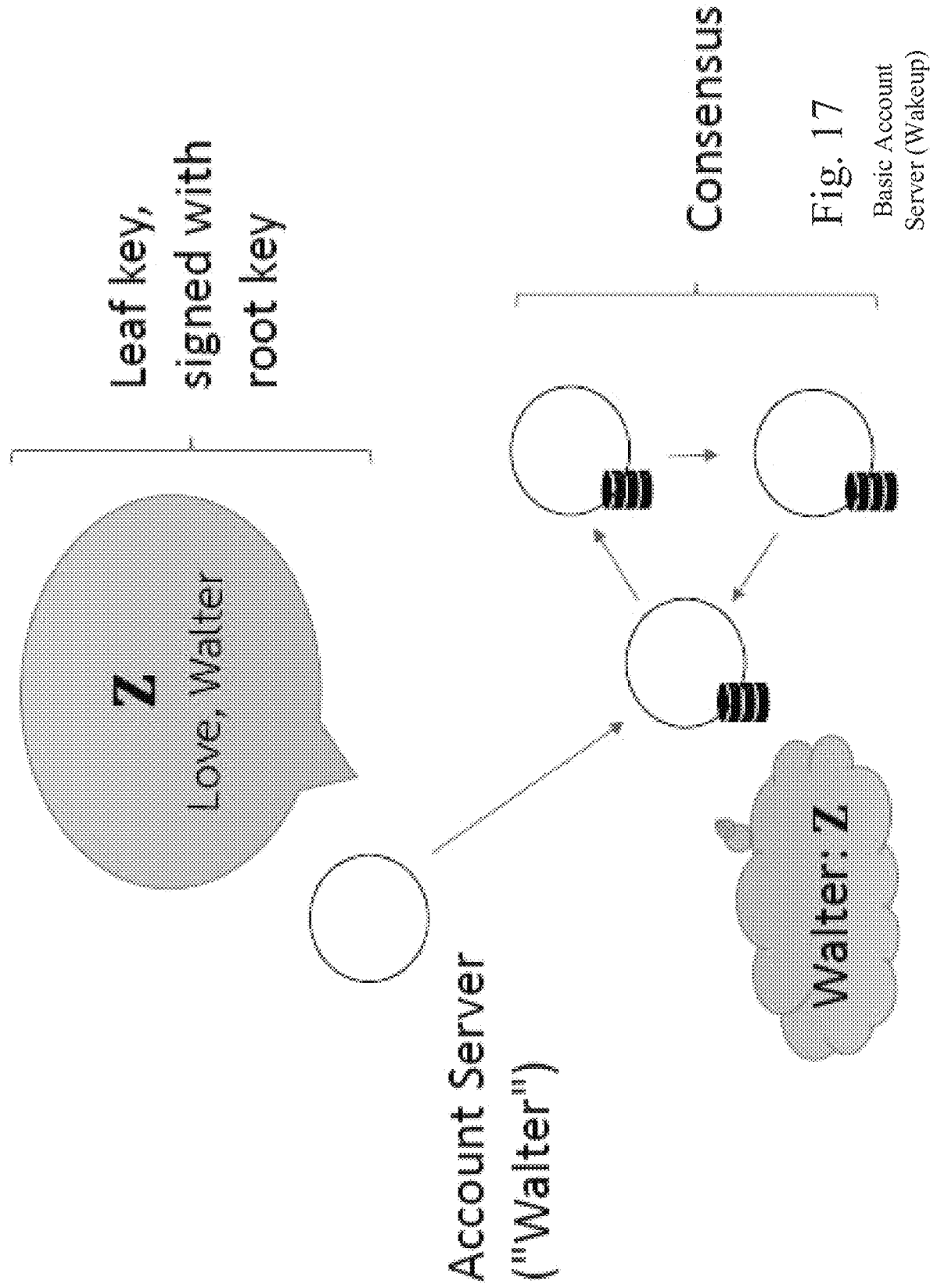
FIGS. 17 through 27 illustrate examples of interactions between users, the secure network, the account server, the recovery ledger, and the wallet server in an example embodiment.
Figure 18:
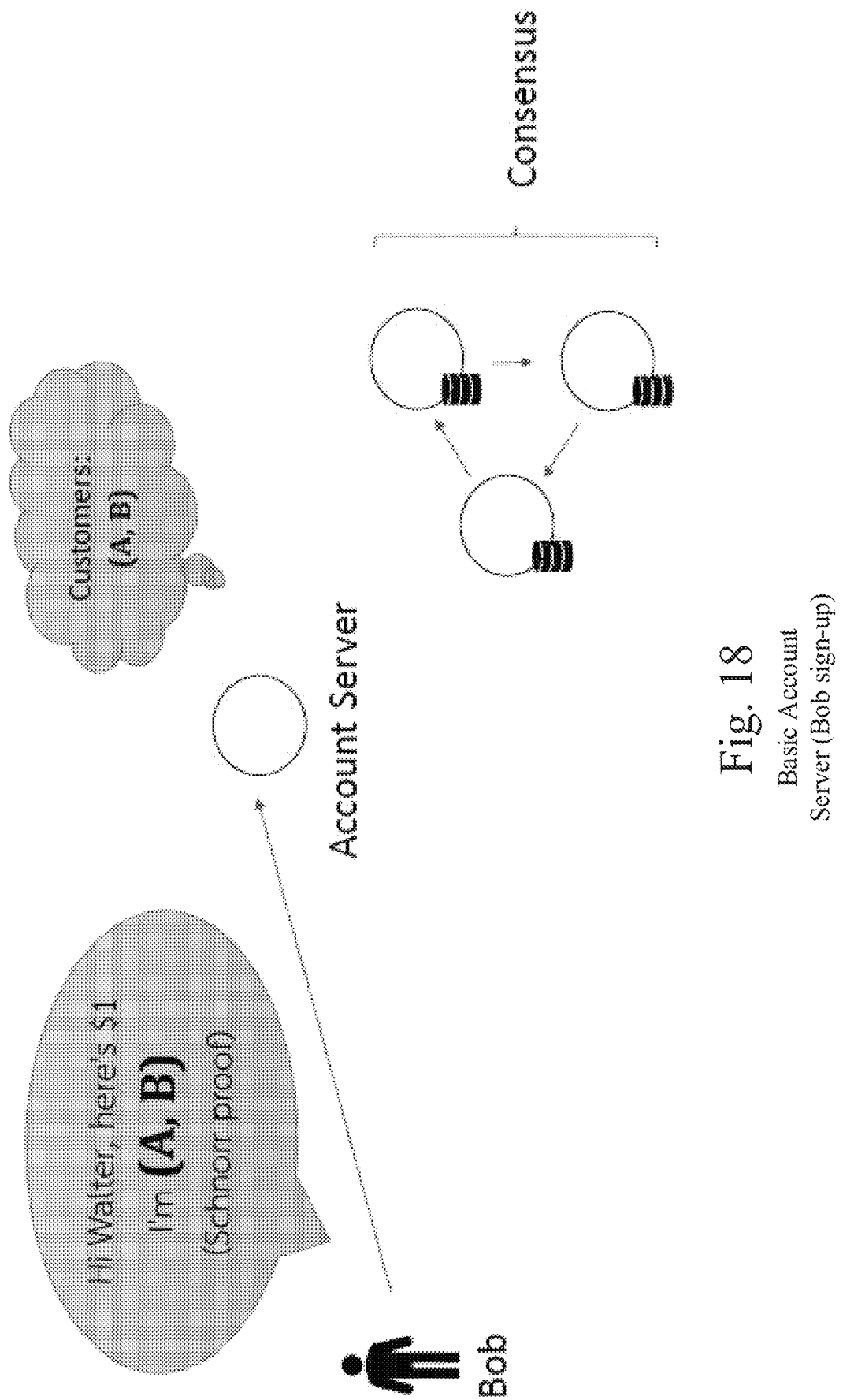
Figure 19:
Figure 19:
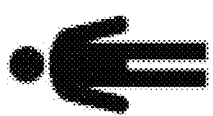
Figure 20:
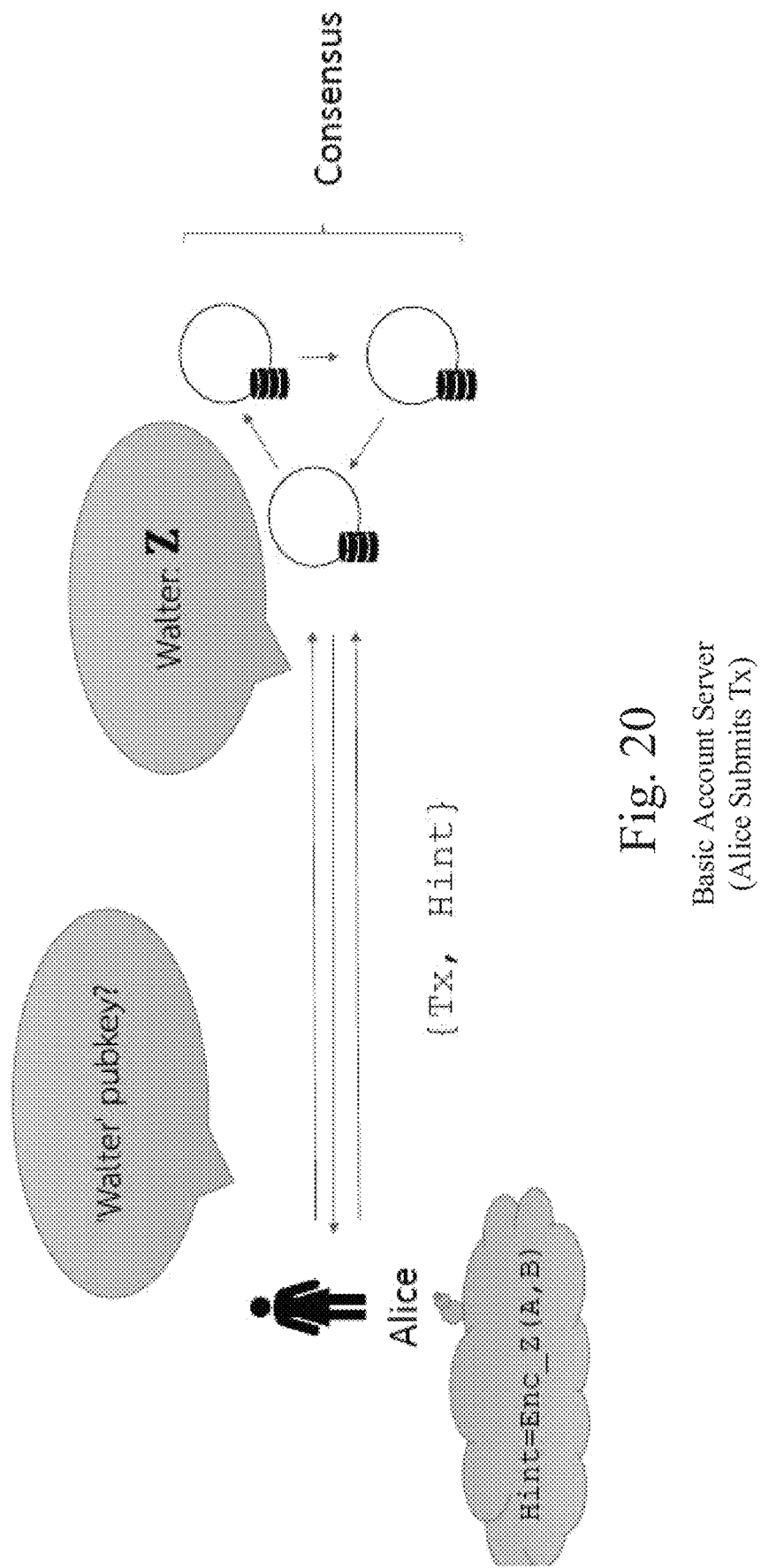
Figure 21:
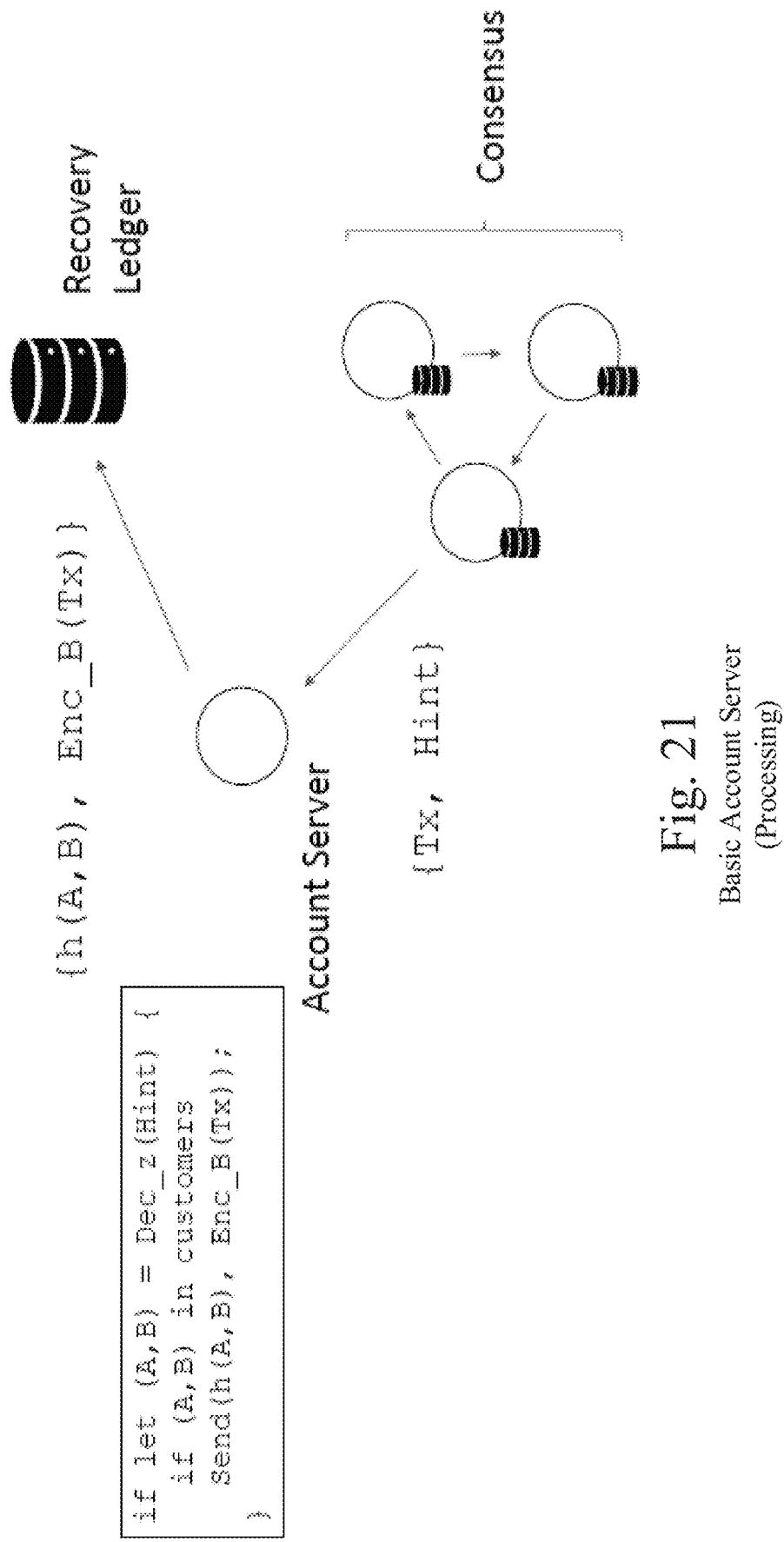
Figure 22:
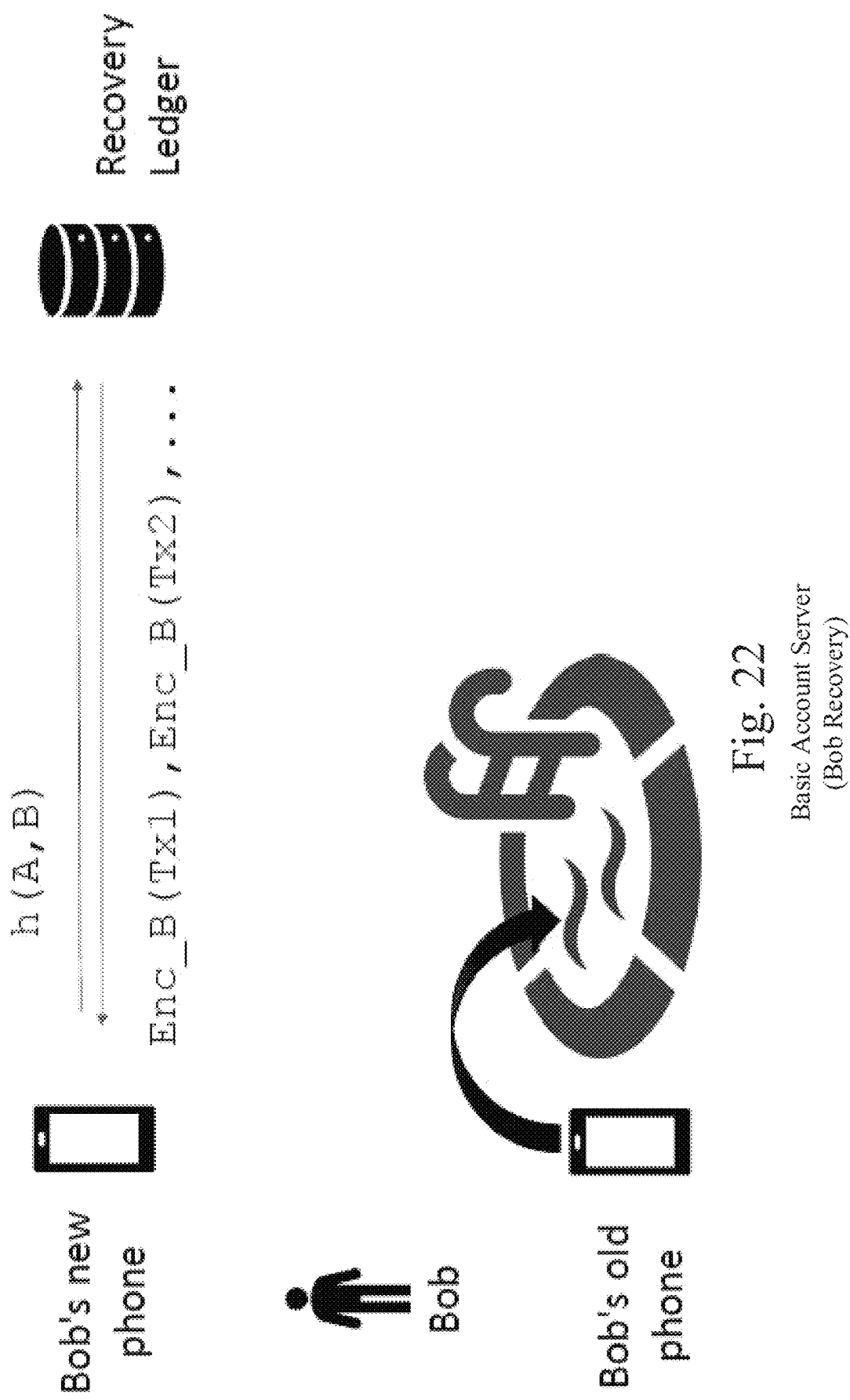

FIG. 17 illustrates an example embodiment of a basic system wherein an Account Server (code named Walter) is initiated with a leaf key signed with a root key. The leaf key is transferred to the consensus network. FIG. 18 illustrates an example embodiment of a basic system wherein the example client user (e.g., Bob) initiates a sign-up operation with the Account Server (Walter). FIG. 19 illustrates an example embodiment of a basic system wherein the example client user (e.g., Bob) publishes his use of the service with the Account Server (Walter). FIG. 20 illustrates an example embodiment of a basic system wherein the example client user (e.g., Alice) initiates a transaction (Tx), which also includes an account hint generated from an encryption of a client user's (e.g., Bob) public key and his presence at Account Server (Walter). The transaction and the hint of the client user (e.g., Alice) can be submitted to the consensus network. FIG. 21 illustrates an example embodiment of a basic system wherein the Account Server can receive the transaction with the account hint from the consensus network. The Account Server can use the transaction and account hint, decrypt the hint, and add records to the recovery ledger enabling an authorized client user (e.g., Bob) to have access to the transactions. FIG. 22 illustrates an example embodiment of a basic system wherein a client user (e.g., Bob) can access the transactions via the recover ledger.

However, in the basic account server system described above and shown in FIGS. 17 through 22, anyone (e.g., a potential adversary) watching the Recovery Ledger can see when a client user (e.g., Bob) gets a transaction (e.g., they see when "h(A, B)" appears, even if they can't read the transaction Tx). They also know the client user's (e.g., Bob) total number of transactions (Tx's). This information could expose a client user (e.g., Bob) to security risks.

In a more secure account server system illustrated for example embodiments in FIGS. 23 through 27, a client user's (e.g., Bob) transactions are keyed by a sequence that only the client user (e.g., Bob) can predict. In support of this example embodiment, the client user (e.g., Bob) is provided with additional key pairs as described below.

Figure 23:
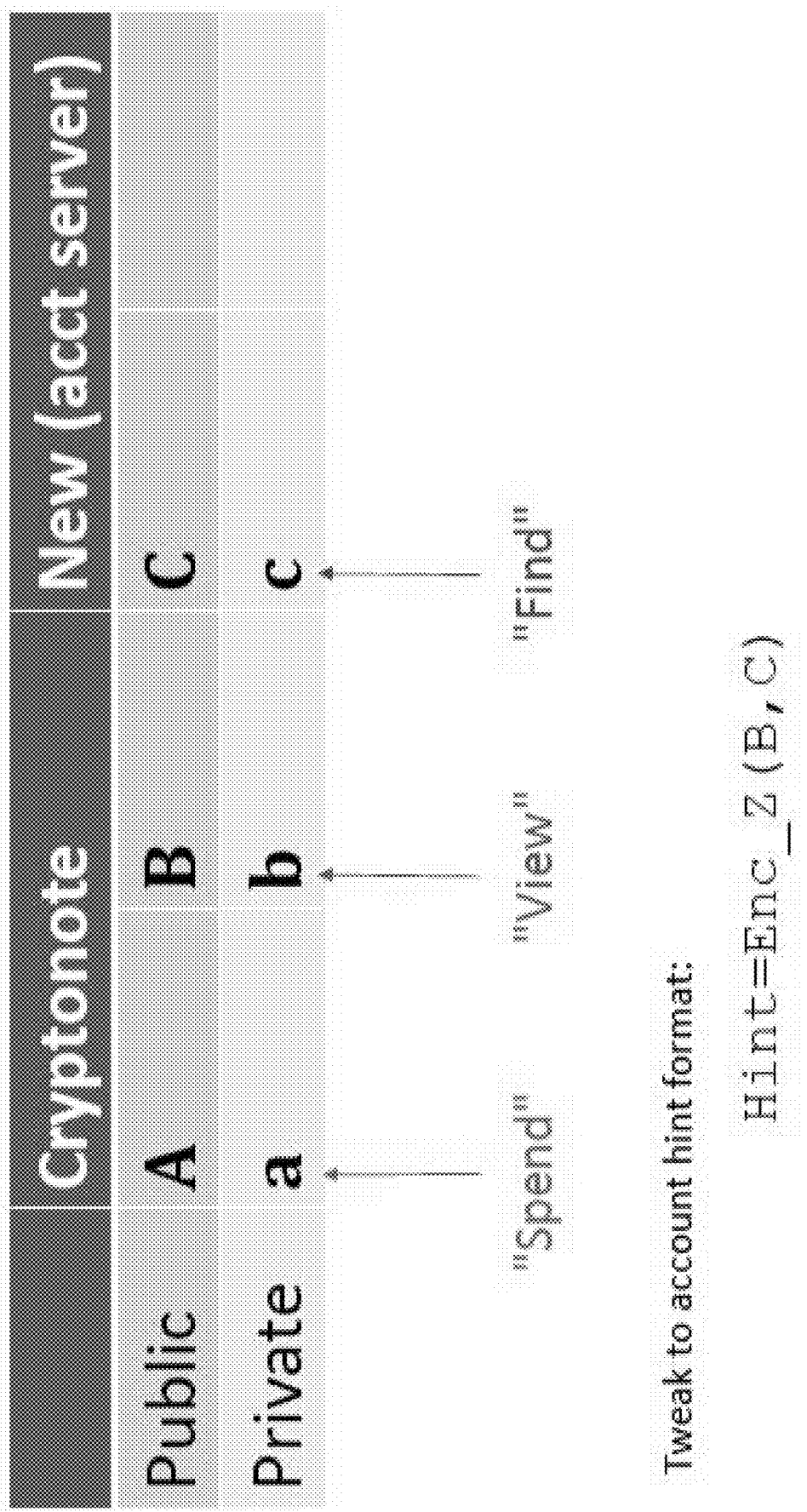
Figure 24:
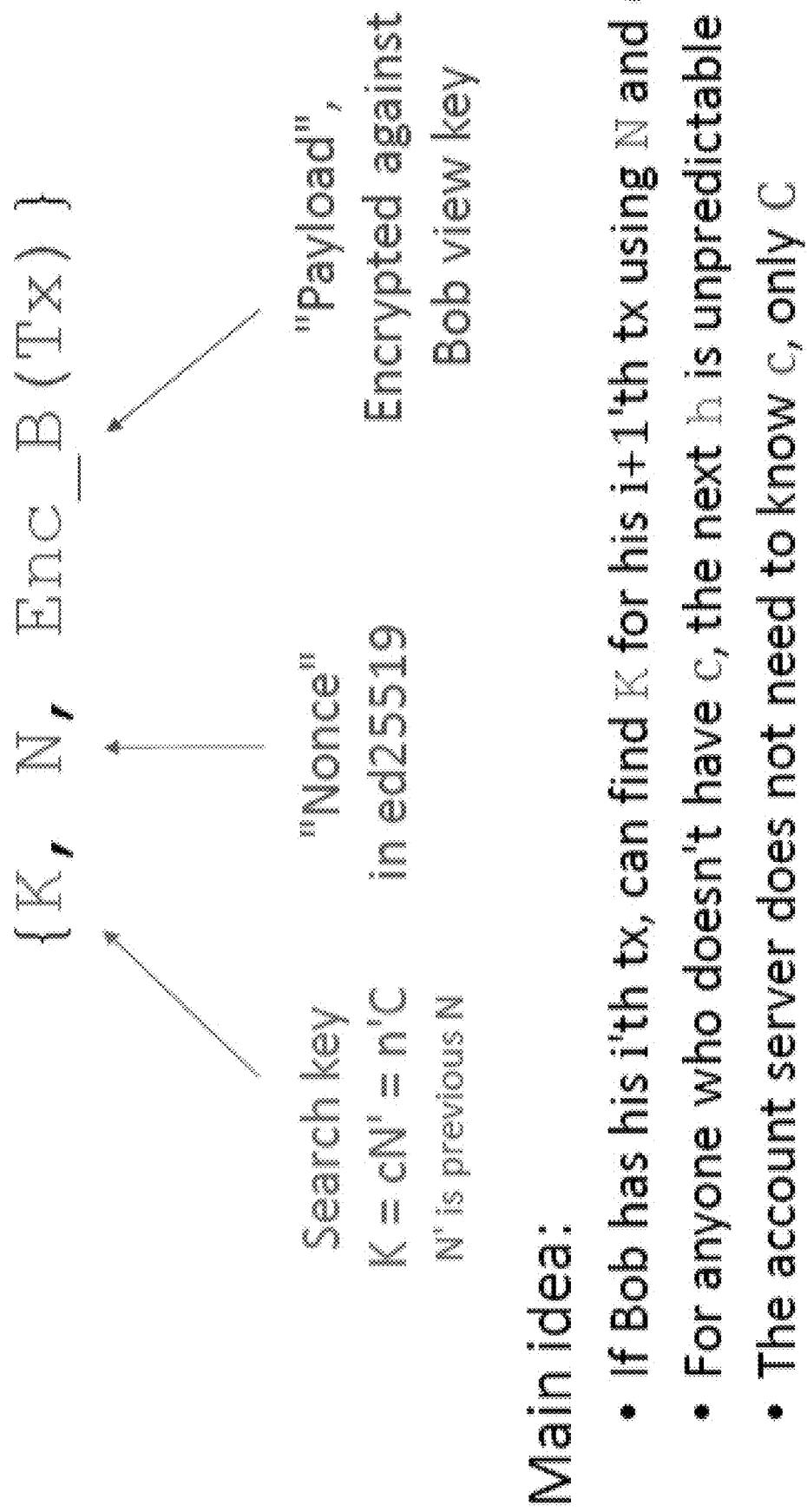

FIG. 23 illustrates an example embodiment wherein a client user (e.g., Bob) can have an associated private spend key, a private view key, and a private find key generated from his corresponding public keys. Hints for the client user's transactions on a particular account server can be encoded from the client user's public keys and the client user's presence at the particular account server. FIG. 24 illustrates an example embodiment showing an example of the recovery ledger format. The client user (e.g., Bob) can find the first transaction using an active signup step to install the first transaction K to be used with the client user's (e.g., Bob) keys. Alternatively, the account server system can perform a Diffie-Hellman (DH) key exchange against C and publish its side of the exchange along with the client user's (e.g., Bob) public keys.

Figure 25:
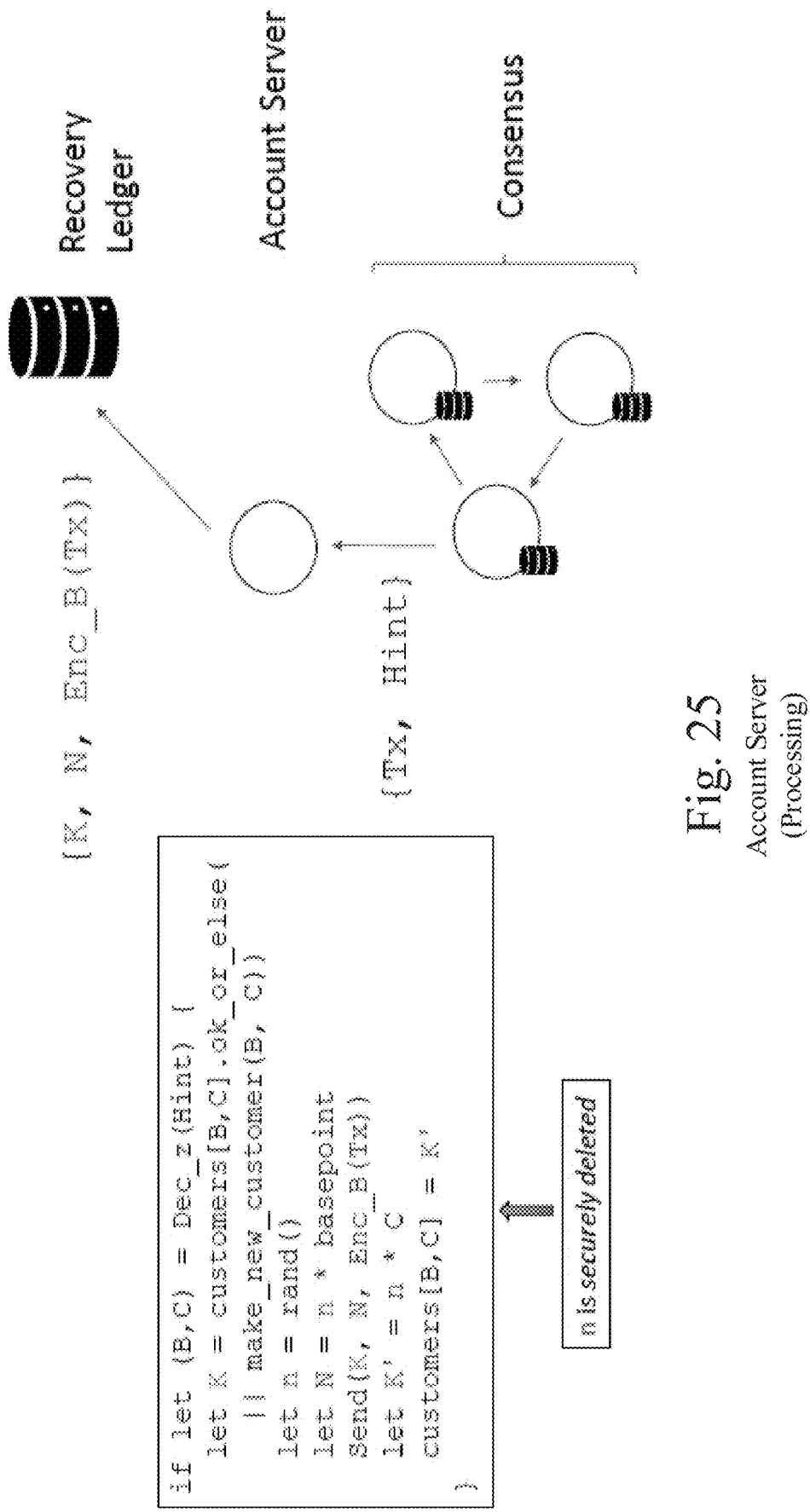

FIG. 25 illustrates an example embodiment showing an example of the transaction, key, and hint processing performed by the Account Server of an example embodiment. In an example embodiment, the Account hint format can be as follows: "Enc_Z(B, C)."

Figure 26:
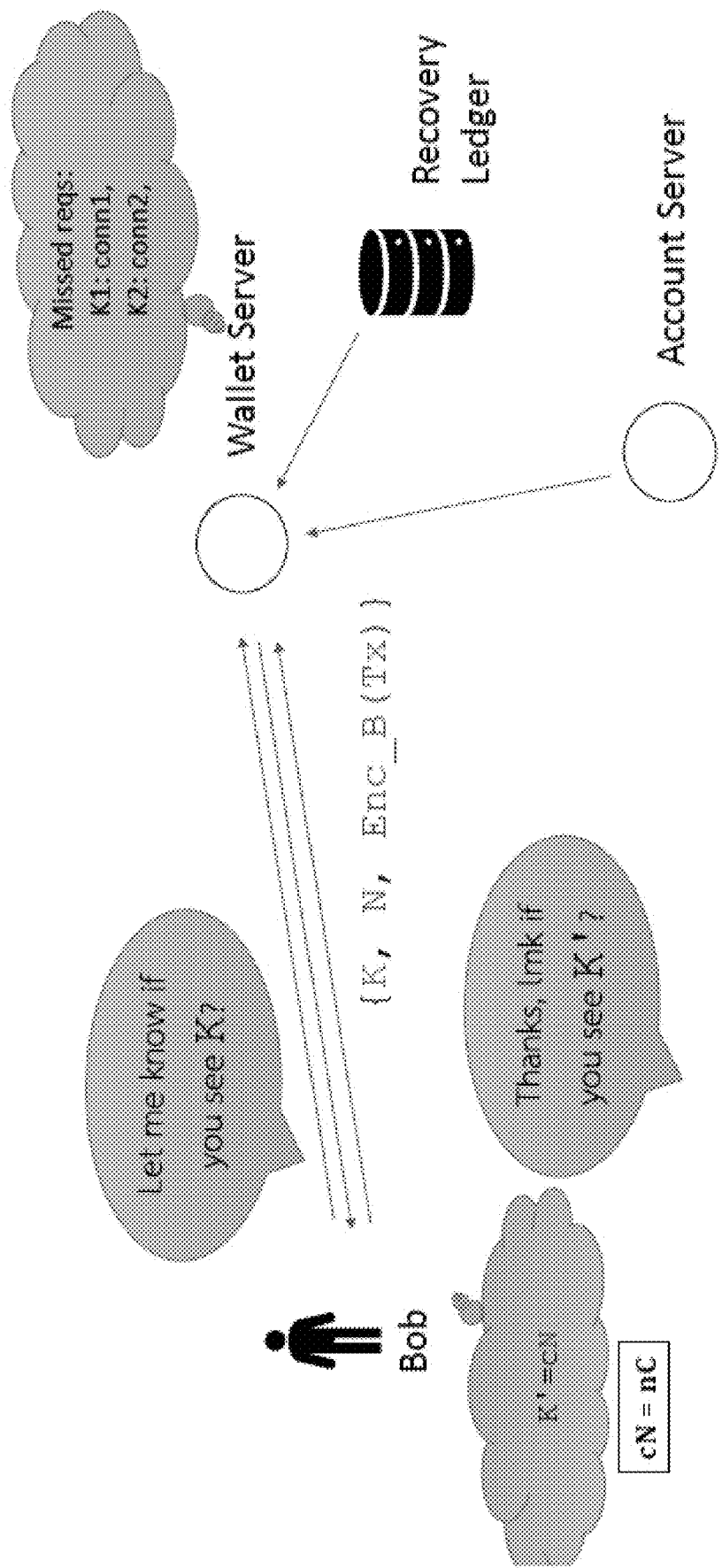
Figure 27:
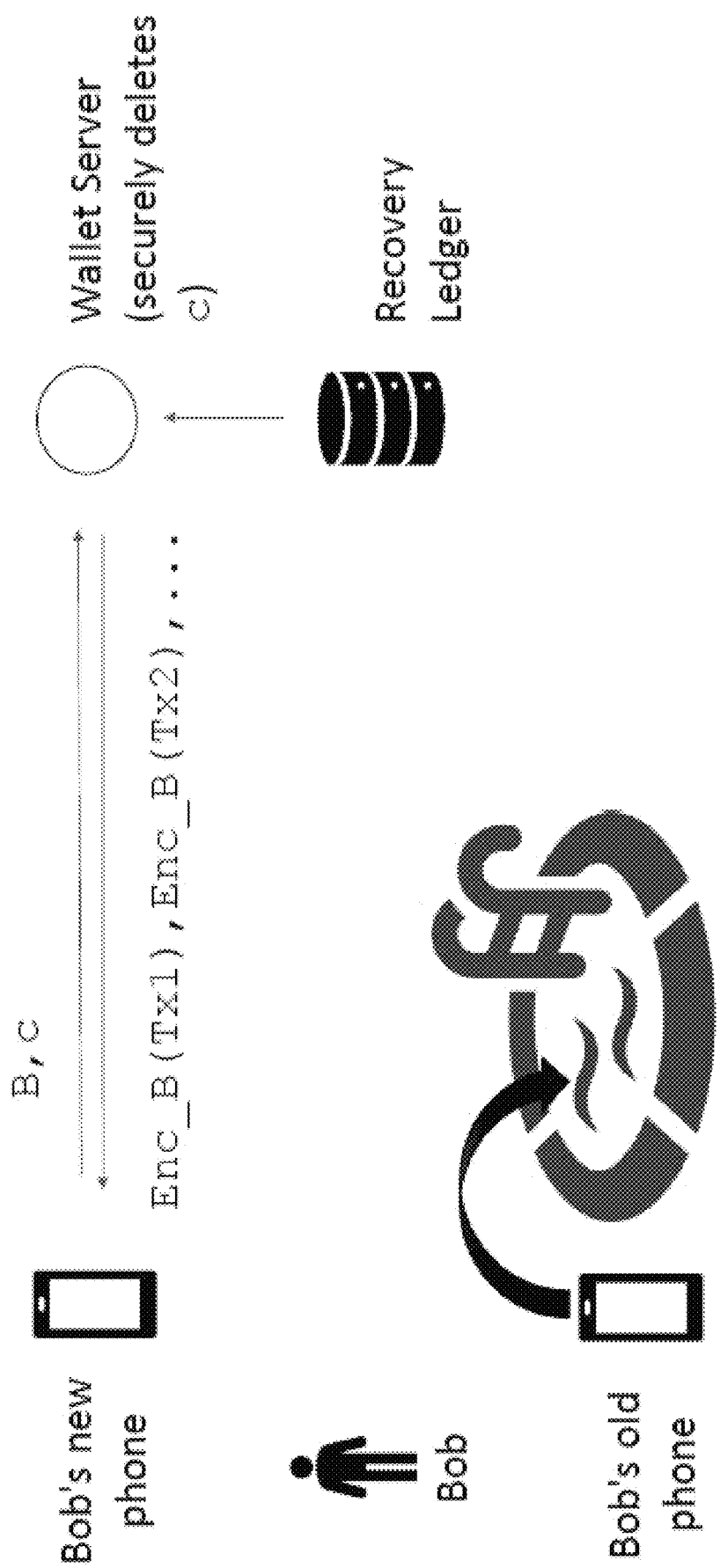

FIG. 26 illustrates an example embodiment showing an example of the notification or polling processing performed by the Wallet Server of an example embodiment. FIG. 27 illustrates an example embodiment showing an example of a full transaction recovery performed by the Wallet Server via the recovery ledger of an example embodiment.

The more secure account server system described above for example embodiments provides several advantages, including: 1) the recovery ledger is totally obscured, so there is no need to further encrypt it, seal it to an enclave, etc. Furthermore, writes to the recovery ledger are not sensitive; 2) "Key exchange" means that this system is resilient against compromise of the enclave (e.g., SGX). For example, if an adversary learns the client user's (e.g., Bob) current h value, the adversary may find the next transaction, but the adversary is clueless after the first n is missed; 3) For most users who are processing less than one transaction per second, sending nonce's (h) to the wallet server is adequate for notifications and polling, and totally private; and 4) Sending c to the enclave is an option for higher throughput. This option can be a risk; but, the option is less sensitive than a view key.

In some embodiments, the wallet server can be implemented separately from the account server. In this case, the tradeoff is similar to the implementation of the view node versus the implementation of the consensus node as described above. The separation of the wallet server from the account server can have other implications. For example, the account server can simply perform writes to the recovery ledger, while the wallet server supports user requests against the recovery ledger. The account server enclave may have to attest to quorum nodes. The account server can contain data corresponding to "Walter:z", which is extremely sensitive. Less code in the enclave means less chance to be compromised. The account server must be fast enough to keep up with the transaction volume. Moving the support of user requests off of the account server may improve throughput.

Figure 28:
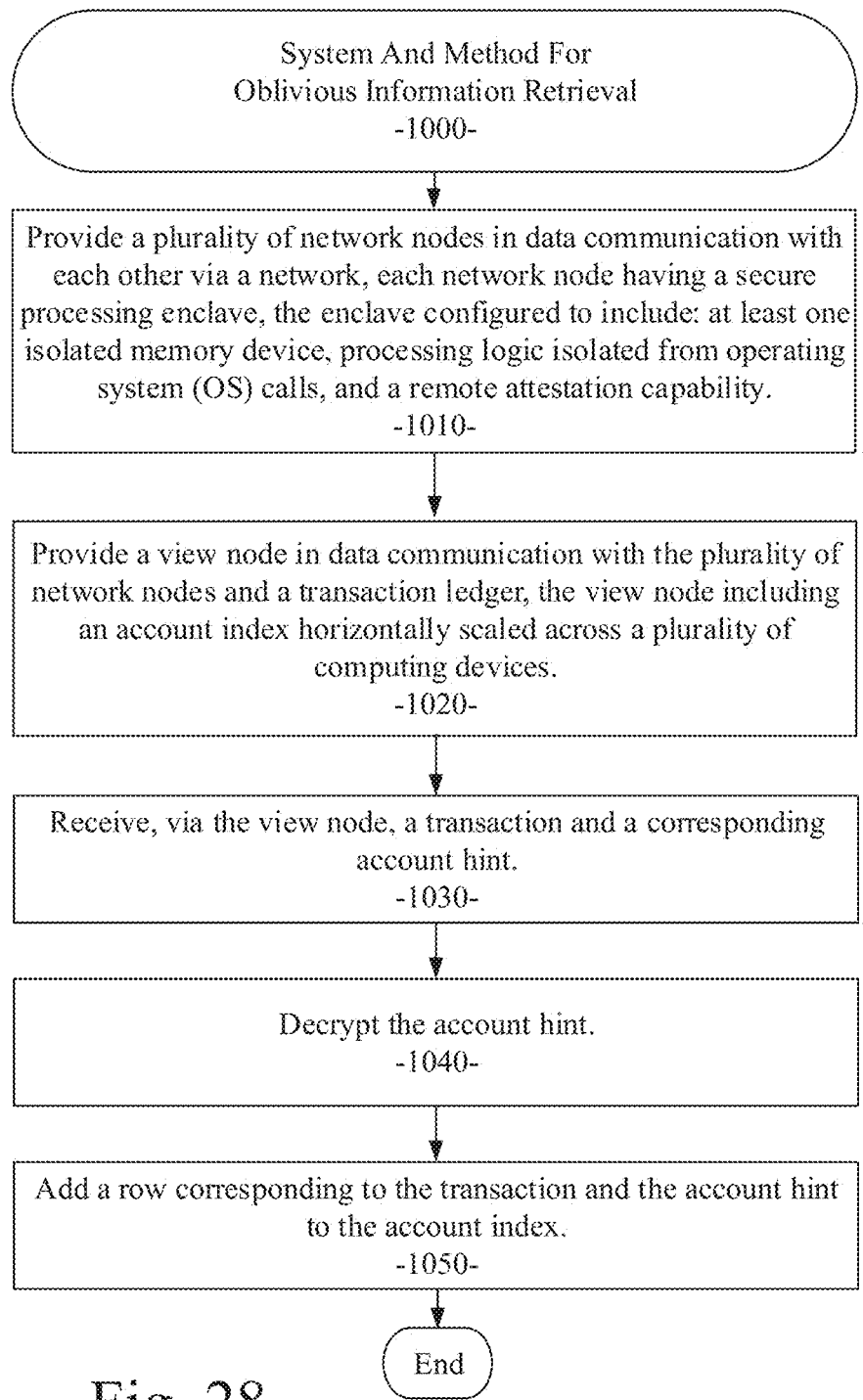
FIG. 28 is a processing flow chart illustrating an example embodiment of a system and method for oblivious information retrieval.

FIG. 28 is a processing flow diagram illustrating an example embodiment of the system and method for oblivious information retrieval as described herein. The method 1000 of an example embodiment includes: providing a plurality of network nodes in data communication with each other via a network, each network node having a secure processing enclave, the enclave configured to include: at least one isolated memory device, processing logic isolated from operating system (OS) calls, and a remote attestation capability (processing block 1010); providing a view node in data communication with the plurality of network nodes and a transaction ledger, the view node including an account index horizontally scaled across a plurality of computing devices (processing block 1020); receiving, via the view node, a transaction and a corresponding account hint (processing block 1030); decrypting the account hint (processing block 1040); and adding a row corresponding to the transaction and the account hint to the account index (processing block 1050).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A secure transaction network having oblivious information retrieval, the secure transaction network comprising:
    a plurality of network nodes in data communication with each other via a network, the plurality of network nodes being configured to perform transaction propagation including consensus and management of a transaction ledger, each network node having a secure processing enclave, the enclave configured to include: at least one isolated memory device, processing logic isolated from operating system (OS) calls, and a remote attestation capability; and
    a view node in data communication with the plurality of network nodes and the transaction ledger, the view node including an account index horizontally scaled across a plurality of computing devices, the view node further configured to receive a transaction and a corresponding account hint, to decrypt the account hint, and to add a row corresponding to the transaction and the account hint to the account index, the account hint including a combination of a public view key and a public find key corresponding to a party of the transaction.

2. The secure transaction network of claim 1 wherein the account hint further includes a public key of an account server.

3. The secure transaction network of claim 1 wherein the enclave is implemented as a Software Guard Extensions (SGX) architecture.

4. The secure transaction network of claim 1 wherein each network node of the plurality of network nodes being in data communication with the transaction ledger.

5. The secure transaction network of claim 1 being further configured to get a seed from the view node, use the seed to calculate a token, and use the token to request the view node to send transactions corresponding to the token.

6. The secure transaction network of claim 1 being further configured to receive a transaction request and distribute the request to each of a plurality of worker shards in the view node.

7. The secure transaction network of claim 6, wherein each worker shard is configured to search for a token corresponding to the request in a subset of transactions in the account index.

8. The secure transaction network of claim 6, wherein each worker shard includes a secure processing enclave in which the account index is stored.

9. The secure transaction network of claim 1 being further configured with a tree-based ORAM access structure to map data blocks to random paths.

10. The secure transaction network of claim 1, wherein at least one of the plurality of network nodes of the secure transaction network generates a private view key and a private find key from the public view key and the public find key corresponding to the party of the transaction.

11. A method comprising:
    providing a plurality of network nodes in data communication with each other via a network, the plurality of network nodes being configured to perform transaction propagation including consensus and management of a transaction ledger, each network node having a secure processing enclave, the enclave configured to include:
        at least one isolated memory device, processing logic isolated from operating system (OS) calls, and a remote attestation capability;
    providing a view node in data communication with the plurality of network nodes and the transaction ledger, the view node including an account index horizontally scaled across a plurality of computing devices;
    receiving, via the view node, a transaction and a corresponding account hint;
    decrypting the account hint; and
    adding a row corresponding to the transaction and the account hint to the account index, the account hint including a combination of a public view key and a public find key corresponding to a party of the transaction.

12. The method of claim 11 wherein the account hint further includes a public key of an account server.

13. The method of claim 11 wherein the enclave is implemented as a Software Guard Extensions (SGX) architecture.

14. The method of claim 11 wherein each network node of the plurality of network nodes being in data communication with the transaction ledger.

15. The method of claim 11 including getting a seed from the view node, using the seed to calculate a token, and using the token to request the view node to send transactions corresponding to the token.

16. The method of claim 11 including receiving a transaction request and distributing the request to each of a plurality of worker shards in the view node.

17. The method of claim 16, wherein each worker shard is configured to search for a token corresponding to the request in a subset of transactions in the account index.

18. The method of claim 11, including generating a private view key and a private find key from the public view key and the public find key corresponding to the party of the transaction.

19. In a secure transaction network having oblivious information retrieval, the secure transaction network having a plurality of network nodes in data communication with each other via a network, the plurality of network nodes being configured to perform transaction propagation including consensus and management of a transaction ledger, each network node having a secure processing enclave, the enclave configured to include: at least one isolated memory device, processing logic isolated from operating system (OS) calls, and a remote attestation capability, and a view node in data communication with the plurality of network nodes and the transaction ledger, the view node including an account index horizontally scaled across a plurality of computing devices, a non-transitory machine-useable storage medium embodying instructions which, when executed by a machine, cause the machine to:
    receive, via the view node, a transaction and a corresponding account hint;
    decrypt the account hint; and
    add a row corresponding to the transaction and the account hint to the account index, the account hint including a combination of a public view key and a public find key corresponding to a party of the transaction.

20. The non-transitory machine-useable storage medium of claim 19 wherein the account hint further includes a public key of an account server.

* * * * *